United States Patent
Yliaho et al.

(10) Patent No.: US 11,379,040 B2
(45) Date of Patent: Jul. 5, 2022

(54) TOUCH DISPLAY DEVICE WITH TACTILE FEEDBACK

(71) Applicant: Nokia Technologies Oy, Espoo (FI)

(72) Inventors: Marko Tapani Yliaho, Tampere (FI); Mika Petri Ensio Nenonen, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/773,543

(22) PCT Filed: Mar. 20, 2013

(86) PCT No.: PCT/IB2013/052219
§ 371 (c)(1),
(2) Date: Sep. 8, 2015

(87) PCT Pub. No.: WO2014/147443
PCT Pub. Date: Sep. 25, 2014

(65) Prior Publication Data
US 2016/0018894 A1    Jan. 21, 2016

(51) Int. Cl.
*G06F 3/01* (2006.01)
*G06F 3/043* (2006.01)
*G01C 21/36* (2006.01)

(52) U.S. Cl.
CPC ............ *G06F 3/016* (2013.01); *G06F 3/0433* (2013.01); *G01C 21/3652* (2013.01); *G06F 2203/014* (2013.01); *G06F 2203/04104* (2013.01)

(58) Field of Classification Search
CPC ........ G06F 3/016; G06F 3/041; G06F 3/0412; G06F 2203/014; G06F 2203/04104

USPC .................................................. 345/173–177
See application file for complete search history.

(56) References Cited

U.S. PATENT DOCUMENTS

| | | | |
|---|---|---|---|
| 6,650,338 B1 | 11/2003 | Kolarov et al. | |
| 6,775,396 B2 | 8/2004 | Matsunaga | |
| 7,978,180 B2 | 7/2011 | Kim et al. | |
| 9,196,134 B2* | 11/2015 | Levesque | G06F 3/016 |
| 9,760,241 B1* | 9/2017 | Lewbel | G06F 3/04812 |
| 10,645,834 B2* | 5/2020 | Tossavainen | H05K 7/00 |

(Continued)

FOREIGN PATENT DOCUMENTS

| | | |
|---|---|---|
| EP | 2138928 A2 | 12/2009 |
| EP | 2293531 A1 | 3/2011 |

(Continued)

OTHER PUBLICATIONS

International Search Report and Written Opinion received for corresponding Patent Cooperation Treaty Application No. PPCT/IB2013/052219, dated Dec. 20, 2013, 15 pages.

(Continued)

*Primary Examiner* — Jason M Mandeville
(74) *Attorney, Agent, or Firm* — Harrington & Smith

(57) ABSTRACT

An apparatus comprising: an image processor configured to determine at least one image parameter with respect to at least one image displayed on at least one display; a touch controller configured to determine at least one touch parameter with respect to the at least one display configured to display the at least one image; and a tactile effect generator configured to generate at least one tactile signal based on the at least one touch parameter and the at least one image parameter.

19 Claims, 19 Drawing Sheets

(56) References Cited

U.S. PATENT DOCUMENTS

| | | | |
|---|---|---|---|
| 2002/0084721 A1* | 7/2002 | Walczak | H01L 41/08 310/339 |
| 2003/0100969 A1* | 5/2003 | Jones | G06T 17/20 700/83 |
| 2008/0150911 A1 | 6/2008 | Harrison | |
| 2009/0251421 A1 | 10/2009 | Bloebaum | |
| 2010/0079264 A1 | 4/2010 | Hoellwarth | |
| 2010/0141408 A1* | 6/2010 | Doy | G06F 3/016 340/407.2 |
| 2010/0225600 A1* | 9/2010 | Dai | G06F 3/016 345/173 |
| 2010/0231367 A1 | 9/2010 | Cruz-Hernandez et al. | |
| 2010/0231540 A1* | 9/2010 | Cruz-Hernandez | G06F 3/016 345/173 |
| 2011/0313653 A1 | 12/2011 | Lindner | |
| 2011/0316798 A1 | 12/2011 | Jackson et al. | |
| 2012/0050324 A1 | 3/2012 | Jeong et al. | |
| 2012/0206390 A1* | 8/2012 | Ueno | G06F 3/04886 345/173 |
| 2013/0162543 A1* | 6/2013 | Behles | H05K 1/189 345/173 |
| 2013/0257817 A1* | 10/2013 | Yliaho | G06F 3/043 345/173 |
| 2013/0272557 A1* | 10/2013 | Ozcan | H04M 1/0266 381/333 |
| 2013/0300740 A1* | 11/2013 | Snyder | G06F 3/016 345/420 |
| 2014/0071071 A1* | 3/2014 | Hirose | G06F 3/0488 345/173 |
| 2014/0145836 A1* | 5/2014 | Tossavainen | G06F 3/016 340/407.2 |
| 2014/0208204 A1* | 7/2014 | Lacroix | G06F 3/016 715/702 |
| 2014/0241558 A1* | 8/2014 | Yliaho | H04R 5/02 381/333 |
| 2015/0097786 A1* | 4/2015 | Behles | G06F 3/041 345/173 |
| 2015/0109220 A1* | 4/2015 | Yliaho | G06F 3/016 345/173 |
| 2015/0169059 A1* | 6/2015 | Behles | G06F 3/0488 345/173 |
| 2015/0234464 A1* | 8/2015 | Yliaho | G06F 3/016 345/473 |
| 2016/0004311 A1* | 1/2016 | Yliaho | G06F 3/165 381/99 |

FOREIGN PATENT DOCUMENTS

| | | |
|---|---|---|
| WO | 2006004894 A2 | 1/2006 |
| WO | 2009/083928 A1 | 7/2009 |
| WO | 2009/126176 A1 | 10/2009 |
| WO | 2012/037157 A2 | 3/2012 |
| WO | 2012/076062 A1 | 6/2012 |

OTHER PUBLICATIONS

Carmigniani et al., "Augmented Reality Technologies, Systems and Applicaitons" Multimedia Tools and Applications, Jan. 2011, vol. 51, Issue 1, pp. 341-377.

Lin et al., "A Tangible Medical Image Processing Assistant with Haptic Modality" Conference Proceedings of 6th International Conference on Complex, Intelligent and Software Intensive Systems, Jul. 4-6, 2012, Palermo, Italy, pp. 723-728.

"Hue", Wikipedia, Retrieved on Nov. 16, 2016, Webpage available at: https://en.wikipedia.org/wiki/Hue.

"2D-Plus-Depth", Wikipedia, Retrieved on Nov. 16, 2016, Webpage available at: https://en.wikipedia.org/wiki/2D-plus-depth.

Kim et al., "A Haptic Interaction Method Using Visual Information And Physically Based Modeling", IEEE/ASME Transactions on Mechatronics, vol. 15, No. 4, Aug. 2010, pp. 636-645.

Yang et al., "Depth Map Generation From A Single Image Using Local Depth Hypothesis", IEEE International Conference on Consumer Electronics, 2012, pp. 311-312.

"Guessing Depth from Single Image", Youtube, Retrieved on Nov. 16, 2016, Webpage available at : https://www.youtube.com/watch?v=Z7dnDwhffis.

Zelek et al., "A Stereo-Vision System For The Visually Impaired", Technical Report, 2000, pp. 1-9.

Ryu et al., "A Haptic Modeling System", INTECH Advances in Haptics, Apr. 1, 2010, pp. 357-375.

Extended European Search Report received for corresponding European Patent Application No. 13878756.9, dated Nov. 7, 2016, 14 pages.

"New Technology: Haptic Feedback For Touchscreens", Gamespot, Retrieved on Nov. 16, 2016, Webpage available at : https://gaming.youtube.com/watch?v=FiCqlYKRIAA&list=PLI-zCVdCxH_If_wZWFINEX672AIR43knk.

"Senseg Technology Explained", Trusted Reviews, Retrieved on Nov. 16, 2016, Webpage available at : http://www.trustedreviews.com/news/senseg-feel-technology-explained.

* cited by examiner

1901

TOUCH DISPLAY DEVICE WITH TACTILE FEEDBACK

RELATED APPLICATION

This application was originally filed as Patent Cooperation Treaty Application No. PCT/IB2013/052219 filed Mar. 20, 2013.

FIELD

The present invention relates to a providing tactile functionality. The invention further relates to, but is not limited to, display apparatus providing tactile functionality for use in mobile devices.

BACKGROUND

Many portable devices, for example mobile telephones, are equipped with a display such as a glass or plastic display window for providing information to the user. Furthermore such display windows are now commonly used as touch sensitive inputs. The use of a touch sensitive input with the display has the advantage over a mechanical keypad in that the display may be configured to show a range of different inputs depending on the operating mode of the device. For example, in a first mode of operation the display may be enabled to enter a phone number by displaying a simple numeric keypad arrangement and in a second mode the display may be enabled for text input by displaying an alphanumeric display configuration such as a simulated Qwerty keyboard display arrangement.

The display such as glass or plastic is typically static in that although the touch screen can provide a global haptic feedback simulating a button press by use of a vibra it does not simulate features shown on the display. In other words any tactile feedback is not really localised as the whole display or device vibrates and the display is unable to provide a different sensation other than that of glass or plastic.

STATEMENT

According to an aspect, there is provided a method comprising: determining at least one image parameter with respect to at least one image displayed on at least one display; determining at least one touch parameter with respect to the at least one display configured to display the at least one image; and generating at least one tactile signal based on the at least one touch parameter and/or the at least one image parameter.

There is further provided a method comprising: determining at least one image parameter with respect to at least one image displayed on at least one display; determining at least one touch parameter with respect to the at least one display configured to display the at least one image; and generating at least one tactile signal based on the at least one touch parameter and the at least one image parameter.

The method may further comprise: capturing the at least one image with at least one camera; and displaying the at least one image on the at least one display.

Determining at least one touch parameter may comprise determining at least one of: no touch; at least one touch location; at least one touch speed; at least one touch direction; at least one touch velocity; at least one touch acceleration; at least one touch force; and at least one touch pressure.

Determining at least one image parameter with respect to the at least one image displayed on the display may comprise determining at least one of: an image luma value; an image chroma value; an image depth; an image plane; an image polygon; an image line; and an image edge.

Determining at least one image parameter with respect to the at least one image displayed on the at least one display may comprise: determining at least one image edge; determining at least one plane/polygon within the at least one image edge; generating a plane/polygon parameter value associated with the at least one plane/polygon.

The method may further comprise generating at least one depth parameter value within the at least one plane/polygon.

Generating at least one tactile signal based on the at least one touch parameter and the at least one image parameter may comprise: generating at least one template signal; and modifying the at least one template signal based on the at least one touch parameter and the at least one image parameter.

Modifying the at least one template signal based on the at least one touch parameter and the at least one image parameter may comprise at least one of: modifying the at least one template signal amplitude based on the at least one touch parameter and the at least one image parameter; modifying the at least one template signal frequency based on the at least one touch parameter and the at least one image parameter; and modifying the at least one template signal pitch based on the at least one touch parameter and the at least one image parameter.

Determining at least one image parameter with respect to the at least one image displayed on the at least one display may comprise determining at least one region within the at least one image and associating a region value with the region.

Determining at least one touch parameter with respect to the display may comprise determining a touch location within the at least one region.

Generating at least one tactile signal based on the at least one touch parameter and the at least one image parameter may comprise: generating a tactile signal based on the region value; and presenting the at least one tactile signal at the touch location within the region.

Determining at least one touch parameter with respect to the at least one display comprises at least one of: determining a touch location, and presenting the at least one tactile signal proximate to the touch location; determining no touch location on the at least one display, and presenting the at least one tactile signal such that an apparatus comprising the at least one display presents the at least one tactile signal throughout the whole apparatus.

According to a second aspect there is provided an apparatus comprising at least one processor and at least one memory including computer program code for one or more programs, the at least one memory and the computer program code configured to, with the at least one processor, cause the apparatus at least to: determine at least one image parameter with respect to at least one image displayed on at least one display; determine at least one touch parameter with respect to the at least one display configured to display the at least one image; and generate at least one tactile signal based on the at least one touch parameter and/or the at least one image parameter.

There is provided an apparatus comprising at least one processor and at least one memory including computer program code for one or more programs, the at least one memory and the computer program code configured to, with the at least one processor, cause the apparatus at least to:

determine at least one image parameter with respect to at least one image displayed on at least one display; determine at least one touch parameter with respect to the at least one display configured to display the at least one image; and generate at least one tactile signal based on the at least one touch parameter and the at least one image parameter.

The apparatus may be further caused to: capture the at least one image with at least one camera; and display the at least one image on the display.

Determining at least one touch parameter may cause the apparatus to determine at least one of: no touch; at least one touch location; at least one touch speed; at least one touch direction; at least one touch velocity; at least one touch acceleration; at least one touch force; and at least one touch pressure.

Determining at least one image parameter with respect to the at least one image displayed on the at least one display may cause the apparatus to determine at least one of: an image luma value; an image chroma value; an image depth; an image plane; an image polygon; an image line; and an image edge.

Determining at least one image parameter with respect to the at least one image displayed on the at least one display may cause the apparatus to determine at least one of: at least one image edge; at least one plane/polygon within the at least one image edge; at least one plane/polygon parameter value associated with the at least one plane/polygon.

The apparatus may be further caused to generate at least one depth parameter value within the at least one plane/polygon.

Generating at least one tactile signal based on the at least one touch parameter and the at least one image parameter may cause the apparatus to: generate at least one template signal; and modify the at least one template signal based on the at least one touch parameter and the at least one image parameter.

Modifying the at least one template signal based on the at least one touch parameter and the at least one image parameter may cause the apparatus to perform at least one of: modify the at least one template signal amplitude based on the at least one touch parameter and the at least one image parameter; modify the at least one template signal frequency based on the at least one touch parameter and the at least one image parameter; and modify the at least one template signal pitch based on the at least one touch parameter and the at least one image parameter.

Determining at least one image parameter with respect to the at least one image displayed on the at least one display may cause the apparatus to: determine at least one region within the at least one image; and associate a region value with the region.

Determining at least one touch parameter with respect to the at least one display may cause the apparatus to determine a touch location within the at least one region.

Generating at least one tactile signal based on the at least one touch parameter and the at least one image parameter may cause the apparatus to: generate a tactile signal based on the region value; and present the at least one tactile signal at the touch location within the region.

Determining at least one touch parameter with respect to the at least one display may cause the apparatus to perform at least one of: determine a touch location, and present the at least one tactile signal proximate to the touch location; and determine no touch location on the at least one display, and present the at least one tactile signal such that an apparatus comprising the display presents the at least one tactile signal throughout the whole apparatus.

According to a third aspect there is provided an apparatus comprising: means for determining at least one image parameter with respect to at least one image displayed on at least one display; means for determining at least one touch parameter with respect to the at least one display configured to display the at least one image; and means for generating at least one tactile signal based on the at least one touch parameter and/or the at least one image parameter.

There is provided an apparatus comprising: means for determining at least one image parameter with respect to at least one image displayed on at least one display; means for determining at least one touch parameter with respect to the at least one display configured to display the at least one image; and means for generating at least one tactile signal based on the at least one touch parameter and the at least one image parameter.

The apparatus may further comprise: means for capturing the at least one image with at least one camera; and means for displaying the at least one image on the at least one display.

The means for determining at least one touch parameter may comprise means for determining at least one of: no touch; at least one touch location; at least one touch speed; at least one touch direction; at least one touch velocity; at least one touch force; at least one touch acceleration; and at least one touch pressure.

The means for determining at least one image parameter with respect to the at least one image displayed on the at least one display may comprise means for determining at least one of: an image luma value; an image chroma value; an image depth; an image plane; an image polygon; an image line; and an image edge.

The means for determining at least one image parameter with respect to the at least one image displayed on the at least one display may comprise means for determining at least one of: at least one image edge; at least one plane/polygon within the at least one image edge; at least one plane/polygon parameter value associated with the at least one plane/polygon.

The apparatus may further comprise means for generating at least one depth parameter value within the at least one plane/polygon.

The means for generating at least one tactile signal based on the at least one touch parameter and the at least one image parameter may comprise: means for generating at least one template signal; and means for modifying the at least one template signal based on the at least one touch parameter and the at least one image parameter.

The means for modifying the at least one template signal based on the at least one touch parameter and the at least one image parameter may comprise at least one of: means for modifying the at least one template signal amplitude based on the at least one touch parameter and the at least one image parameter; means for modifying the at least one template signal frequency based on the at least one touch parameter and the at least one image parameter; and means for modifying the at least one template signal pitch based on the at least one touch parameter and the at least one image parameter.

The means for determining at least one image parameter with respect to the at least one image displayed on the at least one display may comprise means for determining at least one region within the at least one image and means for associating a region value with the region.

The means for determining at least one touch parameter with respect to the at least one display may comprise means for determining a touch location within the at least one region.

The means for generating at least one tactile signal based on the at least one touch parameter and the at least one image parameter may comprise: means for generating a tactile signal based on the region value; and means for presenting the at least one tactile signal at the touch location within the region.

The means for determining at least one touch parameter with respect to the at least one display may comprise at least one of: means for determining a touch location, and means for presenting the at least one tactile signal proximate to the touch location; and means for determining no touch location on the at least one display, and means for presenting the at least one tactile signal such that an apparatus comprising the display presents the at least one tactile signal throughout the whole apparatus.

According to a fourth aspect there is provided an apparatus comprising: an image processor configured to determine at least one image parameter with respect to at least one image displayed on at least one display; a touch controller configured to determine at least one touch parameter with respect to the at least one display configured to display the at least one image; and a tactile effect generator configured to generate at least one tactile signal based on the at least one touch parameter and/or the at least one image parameter.

There is further provided an apparatus comprising: an image processor configured to determine at least one image parameter with respect to at least one image displayed on at least one display; a touch controller configured to determine at least one touch parameter with respect to the at least one display configured to display the at least one image; and a tactile effect generator configured to generate at least one tactile signal based on the at least one touch parameter and the at least one image parameter.

The apparatus may further comprise: at least one camera configured to capture the at least one image; and at least one display configured to display the at least one image.

The touch controller may be configured to determine at least one of: no touch; at least one touch location; at least one touch speed; at least one touch direction; at least one touch velocity; at least one touch acceleration; at least one touch force and at least one touch pressure.

The image processor may be configured to determine at least one of: an image luma value; an image chroma value; an image depth; an image plane; an image polygon; an image line; and an image edge.

The image processor may be configured to determine at least one of: at least one image edge; at least one plane/polygon within the at least one image edge; at least one plane/polygon parameter value associated with the at least one plane/polygon.

The image processor may be further be configured to generate at least one depth parameter value within the at least one plane/polygon.

The tactile effect generator may be configured to: generate at least one template signal; and modify the at least one template signal based on the at least one touch parameter and the at least one image parameter.

The tactile effect generator may be configured to modify the at least one template signal based on the at least one touch parameter and the at least one image parameter by at least one of: modifying the at least one template signal amplitude based on the at least one touch parameter and the at least one image parameter; modifying the at least one template signal frequency based on the at least one touch parameter and the at least one image parameter; and modifying the at least one template signal pitch based on the at least one touch parameter and the at least one image parameter.

The image processor may be configured to determine at least one region within the at least one image and associating a region value with the region.

The touch controller may be configured to determine a touch location within the at least one region.

The tactile effect generator may be configured to: generate a tactile signal based on the region value; and present the at least one tactile signal at the touch location within the region.

The touch controller may be configured to determine a touch location, and present the at least one tactile signal proximate to the touch location.

The touch controller may be configured to determine no touch location on the at least one display, and present the at least one tactile signal such that an apparatus comprising the display presents the at least one tactile signal throughout the whole apparatus.

A computer program product stored on a medium for causing an apparatus to may perform the method as described herein.

An electronic device may comprise apparatus as described herein.

A chipset may comprise apparatus as described herein.

SUMMARY OF FIGURES

For better understanding of the present invention, reference will now be made by way of example to the accompanying drawings in which.

DESCRIPTION OF EXAMPLE EMBODIMENTS

The application describes apparatus and methods capable of generating, encoding, storing, transmitting and outputting tactile and acoustic outputs from a touch screen device.

Figure 1:
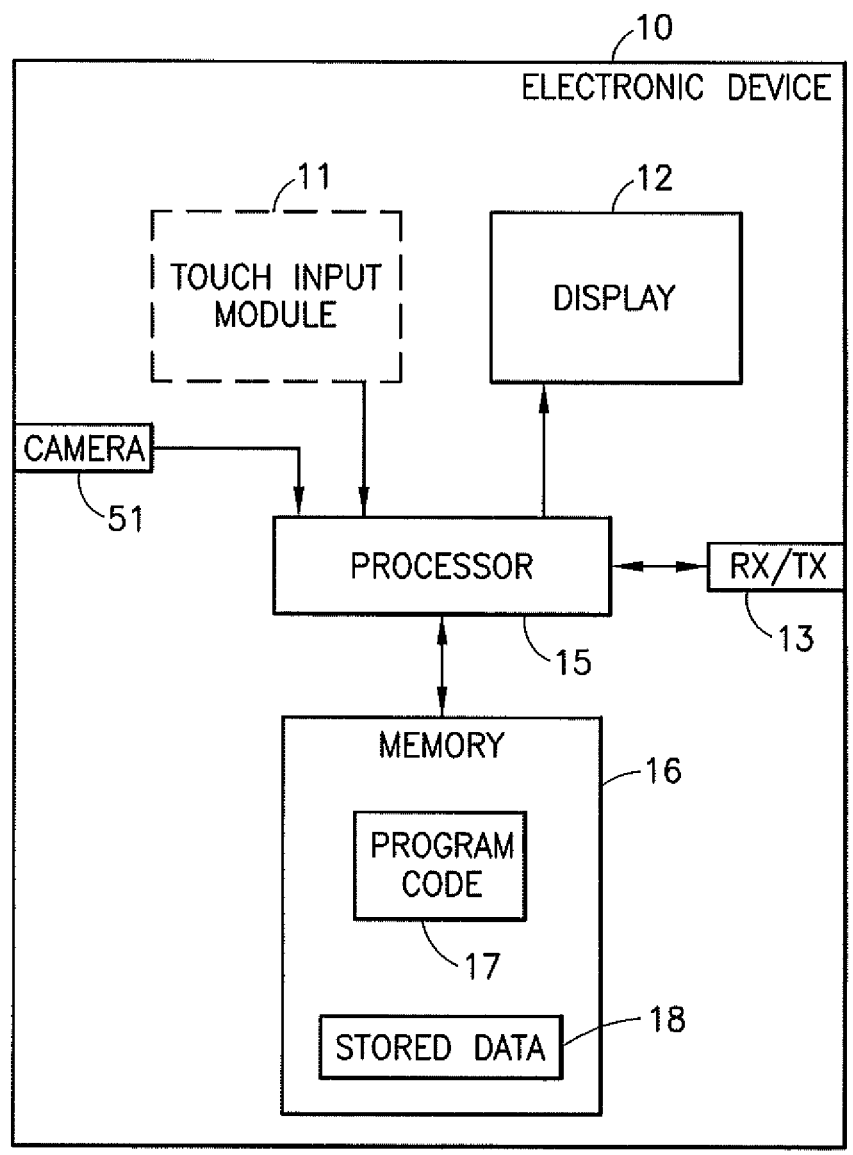
FIG. 1 shows schematically an apparatus suitable for employing some embodiments.

With respect to FIG. 1 a schematic block diagram of an example electronic device 10 or apparatus on which embodiments of the application can be implemented. The apparatus 10 is such embodiments configured to provide improved tactile and acoustic wave generation.

The apparatus 10 is in some embodiments a mobile terminal, mobile phone or user equipment for operation in a wireless communication system. In other embodiments, the apparatus is any suitable electronic device configured to provide an image display, such as for example a digital camera, a portable audio player (mp3 player), a portable video player (mp4 player). In other embodiments the apparatus can be any suitable electronic device with touch interface (which may or may not display information) such as a touch-screen or touch-pad configured to provide feedback when the touch-screen or touch-pad is touched.

The apparatus 10 further in some embodiments comprises a touch input module or user interface 11, which is linked to a processor 15. The processor 15 is further linked to a display 12. The processor 15 is further linked to a transceiver (TX/RX) 13 and to a memory 16.

In some embodiments, the touch input module 11 and/or the display 12 are separate or separable from the electronic device and the processor receives signals from the touch input module 11 and/or transmits and signals to the display 12 via the transceiver 13 or another suitable interface. Furthermore in some embodiments the touch input module 11 and display 12 are parts of the same component. In such embodiments the touch interface module 11 and display 12 can be referred to as the display part or touch display part.

The processor 15 can in some embodiments be configured to execute various program codes. The implemented program codes, in some embodiments can comprise such routines as touch processing, image processing, or tactile effect generation code where the touch input and captured or recorded images are detected and processed, effect feedback signal generation where electrical signals are generated which when passed to a transducer can generate tactile or haptic feedback to the user of the apparatus, or actuator processing configured to generate an actuator signal for driving an actuator. The implemented program codes can in some embodiments be stored for example in the memory 16 and specifically within a program code section 17 of the memory 16 for retrieval by the processor 15 whenever needed. The memory 15 in some embodiments can further provide a section 18 for storing data, for example data that has been processed in accordance with the application, for example pseudo-audio signal data.

The touch input module 11 can be in some embodiments implement any suitable touch screen interface technology. For example in some embodiments the touch screen interface can comprise a capacitive sensor configured to be sensitive to the presence of a finger above or on the touch screen interface. The capacitive sensor can comprise an insulator (for example glass or plastic), coated with a transparent conductor (for example indium tin oxide—ITO). As the human body is also a conductor, touching the surface of the screen results in a distortion of the local electrostatic field, measurable as a change in capacitance. Any suitable technology may be used to determine the location of the touch. The location can be passed to the processor which may calculate how the user's touch relates to the device. The insulator protects the conductive layer from dirt, dust or residue from the finger.

In some other embodiments the touch input module can be a resistive sensor comprising of several layers of which two are thin, metallic, electrically conductive layers separated by a narrow gap. When an object, such as a finger, presses down on a point on the panel's outer surface the two metallic layers become connected at that point: the panel then behaves as a pair of voltage dividers with connected outputs. This physical change therefore causes a change in the electrical current which is registered as a touch event and sent to the processor for processing.

In some other embodiments the touch input module can further determine a touch using technologies such as visual detection for example a camera either located below the surface or over the surface detecting the position of the finger or touching object, projected capacitance detection, infra-red detection, surface acoustic wave detection, dispersive signal technology, and acoustic pulse recognition. In some embodiments it would be understood that 'touch' can be defined by both physical contact and 'hover touch' where there is no physical contact with the sensor but the object located in close proximity with the sensor has an effect on the sensor.

The apparatus 10 can in some embodiments be capable of implementing the processing techniques at least partially in hardware, in other words the processing carried out by the processor 15 may be implemented at least partially in hardware without the need of software or firmware to operate the hardware.

The transceiver 13 in some embodiments enables communication with other apparatus or electronic devices, for example in some embodiments via a wireless communication network.

The display 12 may comprise any suitable display technology. For example the display element can be located below the touch input module and project an image through the touch input module to be viewed by the user. The display 12 can employ any suitable display technology such as liquid crystal display (LCD), light emitting diodes (LED), organic light emitting diodes (OLED), plasma display cells, Field emission display (FED), surface-conduction electronemitter displays (SED), and Electrophoretic displays (also known as electronic paper, e-paper or electronic ink displays).

In some embodiments the apparatus comprises a camera 51 or suitable image capturing means configured to supply to the processor 15 image data. In some embodiments the camera 51 can be configured to supply multiple images over time to provide a video stream. In some embodiments the apparatus comprises multiple cameras or at least one camera and a separate depth of field or distance estimator (such as an ultrasonic or optical distance determiner) wherein the arrangement can provide or enable a distance or depth estimation to be determined. In some embodiments the apparatus can comprise more than one camera or image capturing means. Furthermore the term camera can be understood to cover image capturing means for visual radiation but also non-visual electromagnetic radiation imaging means such as infra-red, ultra-violet and x-ray image means. Furthermore in some embodiments the image capturing means can be sonic imaging means such as ultra-sonic imaging means or similar. It would be further understood that in some embodiments the 'image' is a value of the distance from the camera or apparatus rather than visible colour (chroma), or brightness (luma).

The concept of the embodiments described herein is to implement simulated experiences using the display and tactile outputs and in some embodiments display, tactile and audio outputs. In some embodiments the simulated experiences are simulations of visual features or features captured by the apparatus camera represented on the display using tactile effects. Furthermore these tactile effects can be employed for any suitable haptic feedback wherein an effect is associated with a suitable recorded image when displayed. The concept can be implemented in embodiments by utilizing signal processing or analysis of visual or image data to provide haptic feedback. More specifically the signal processing can be in some embodiments detecting planes within an image or a view to enable a tactile model of the image to be generated. In the embodiments described herein the tactile model "understands" the context and the feedback is based on the "understood" objects.

Figure 2:
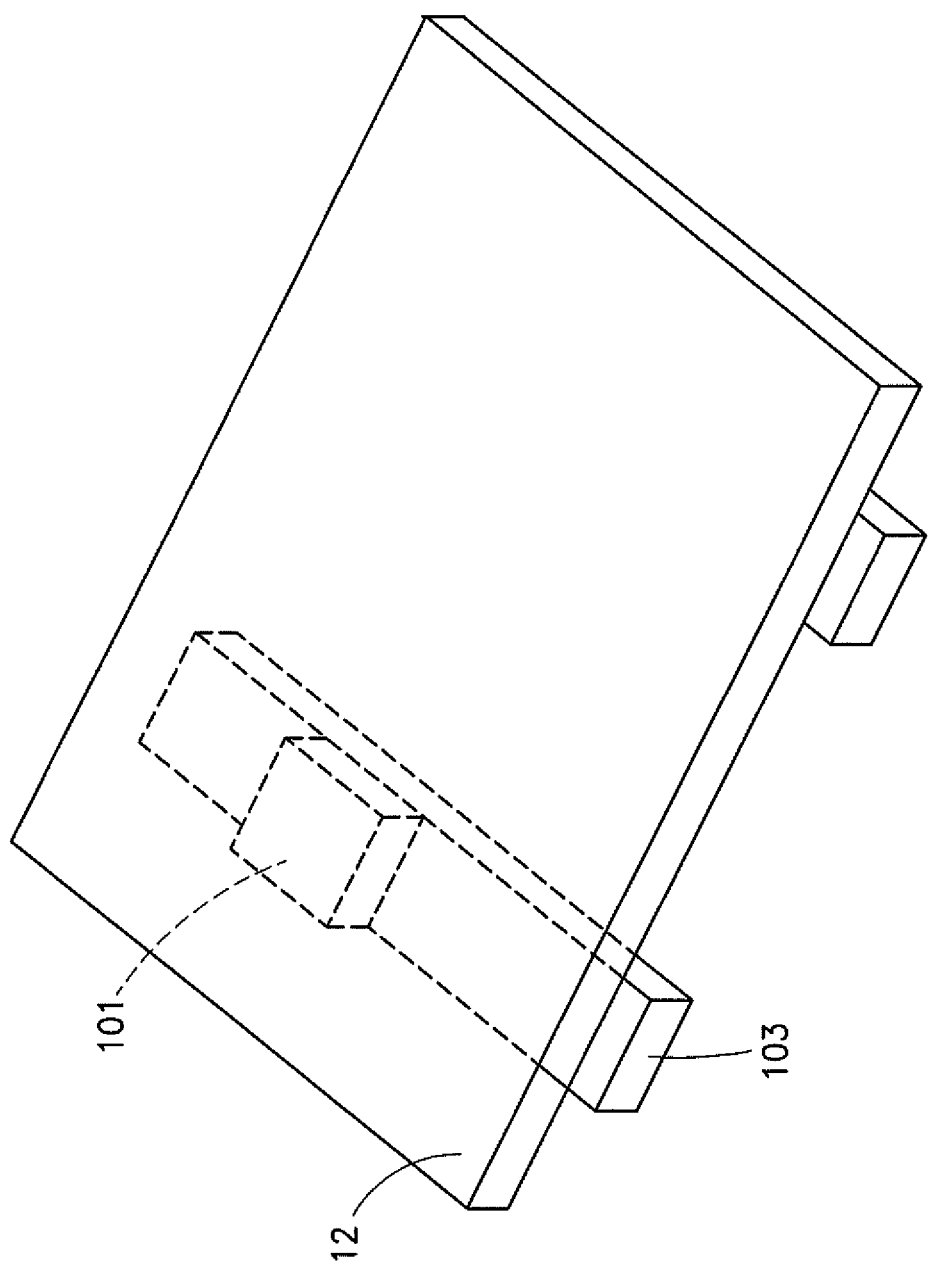
FIG. 2 shows schematically an example tactile audio display with transducer implementation.

An example tactile audio display implementation comprising the display and transducer (or actuator) is shown in FIG. 2. FIG. 2 specifically shows the touch input module 11 and display 12 under which is coupled a pad 101 which can be driven by the transducer 103 located underneath the pad. The motion of the transducer 103 can then be passed through the pad 101 to the display 12 which can then be felt by the user. The transducer or actuator 103 can in some embodiments be a piezo or piezo electric transducer configured to generate a force, such as a bending force when a current is passed through the transducer. This bending force is thus transferred via the pad 101 to the display 12. It would be understood that in other embodiments the arrangement, structure or configuration of the tactile audio display component can be any suitable coupling between the transducer (such as a piezo-electric transducer) and the display. In such a way it can be possible with suitable arrangement of transducers and pads and suitable configuration of the transducers and pads and knowledge of modes of resonance of the display to generate tactile effects across display area.

With respect to FIGS. 3 to 6 suitable tactile effects generator system apparatus are described with respect to embodiments of the application.

Figure 3:
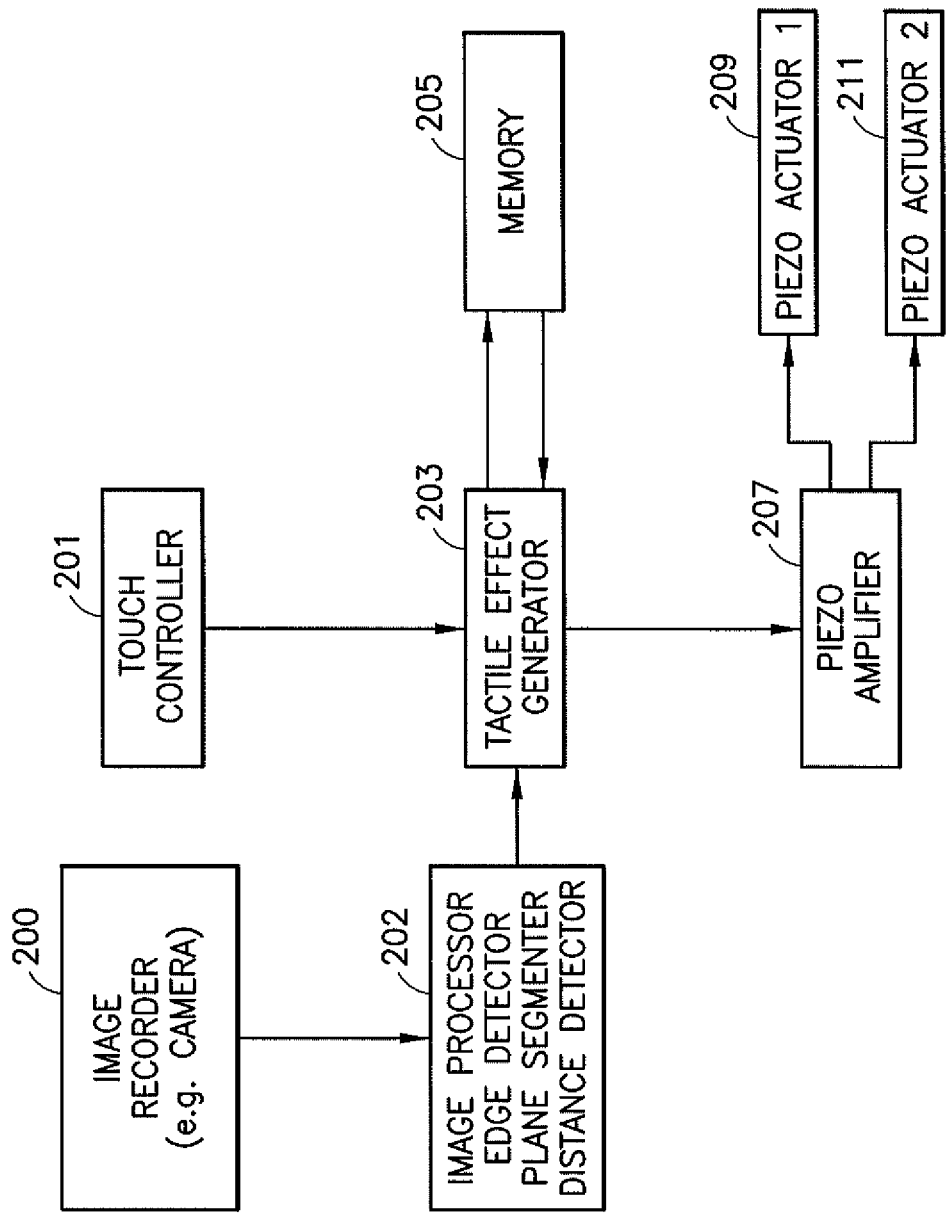
FIGS. 3 to 6 shows schematically example tactile effect generation system apparatus according to some embodiments.

With respect to FIG. 3 a first tactile effect generator system apparatus is described. In some embodiments the apparatus comprise a touch controller 201. The touch controller 201 can be configured to receive input from the tactile audio display or touch screen. The touch controller 201 can then be configured to process these inputs to generate suitable digital representations or characteristics associated with the touch such as: number of touch inputs; location of touch inputs; size of touch inputs; shape of touch input; position relative to other touch inputs; etc. The touch controller 201 can output the touch input parameters to a tactile effect generator 203.

In some embodiments the tactile effect generator system apparatus comprises an image recorder 200 (or image store). For example in some embodiments the image recorder 200 is a camera or image generating means or module (such as shown in FIG. 1 and described herein). In some embodiments the image recorder 200 is part of the data storage part of the memory configured to store an image. In some embodiments the image recorder 200 can be represented by the transceiver receiving an image, for example a downloaded image from the Internet, a map or street view image. The image recorder 200 in some embodiments can be considered to pass the image or view to the image processor 202.

In some embodiments the tactile effect generator system apparatus comprises an image processor 202. The image processor 202 or suitable means for processing an image can in some embodiments be configured to receive the image from the image recorder 200 and process the image to generate image parameters from which the tactile effects for the image can be modelled and generated. The image parameters or image model parameters can in some embodiments be passed to a tactile effect processor 203.

In some embodiments the apparatus comprises a tactile effect generator 203, which can be implemented as an application process engine or suitable tactile effect means. The tactile effect generator 203 is configured to receive the touch parameters from the touch controller 201 and the image parameters or image model parameters from the image processor 202, process the touch parameters in relation to the image parameters or image model parameters to determine whether or not a tactile effect is to be generated, which tactile effect is to be generated, and where the tactile effect is to be generated.

In some embodiments the tactile effect generator 203 can be configured to receive and request information or data from the memory 205. For example in some embodiments the tactile effect generator can be configured to retrieve specific tactile effect signals from the memory in the form of a look up table dependent on the state of the tactile effect generator 203.

In some embodiments the apparatus comprises a memory 205. The memory 205 can be configured to communicate with the tactile effect generator 203. In some embodiments the memory 205 can be configured to store suitable tactile effect "audio" signals which when passed to the piezo amplifier 207 generates suitable haptic feedback using the tactile audio display.

In some embodiments the tactile effect generator 203 can output the generated effect to the piezo amplifier 207.

In some embodiments the apparatus comprises a piezo amplifier 207. The piezo amplifier 207 can be a single channel or multiple channel amplifier configured to receive at least one signal channel output from the tactile effect generator 203 and configured to generate a suitable signal to output to at least one piezo actuator. In the example shown in FIG. 3 the piezo amplifier 207 is configured to output a first actuator signal to a first piezo actuator 209, piezo actuator 1, and a second actuator signal to a second piezo actuator 211, piezo actuator 2.

It would be understood that the piezo amplifier 207 can be configured to output more than or fewer than two actuator signals.

In some embodiments the apparatus comprises a first piezo actuator 209, piezo actuator 1 configured to receive a first signal from the piezo amplifier 207 and a second piezo actuator 211, piezo actuator 2, configured to receive a second signal from the piezo amplifier 207. The piezo actuators are configured to generate a motion to produce the tactile feedback on the tactile audio display. It would be understood that there can be more than or fewer than two piezo actuators and furthermore in some embodiments the actuator can be an actuator other than a piezo actuator.

Figure 4:
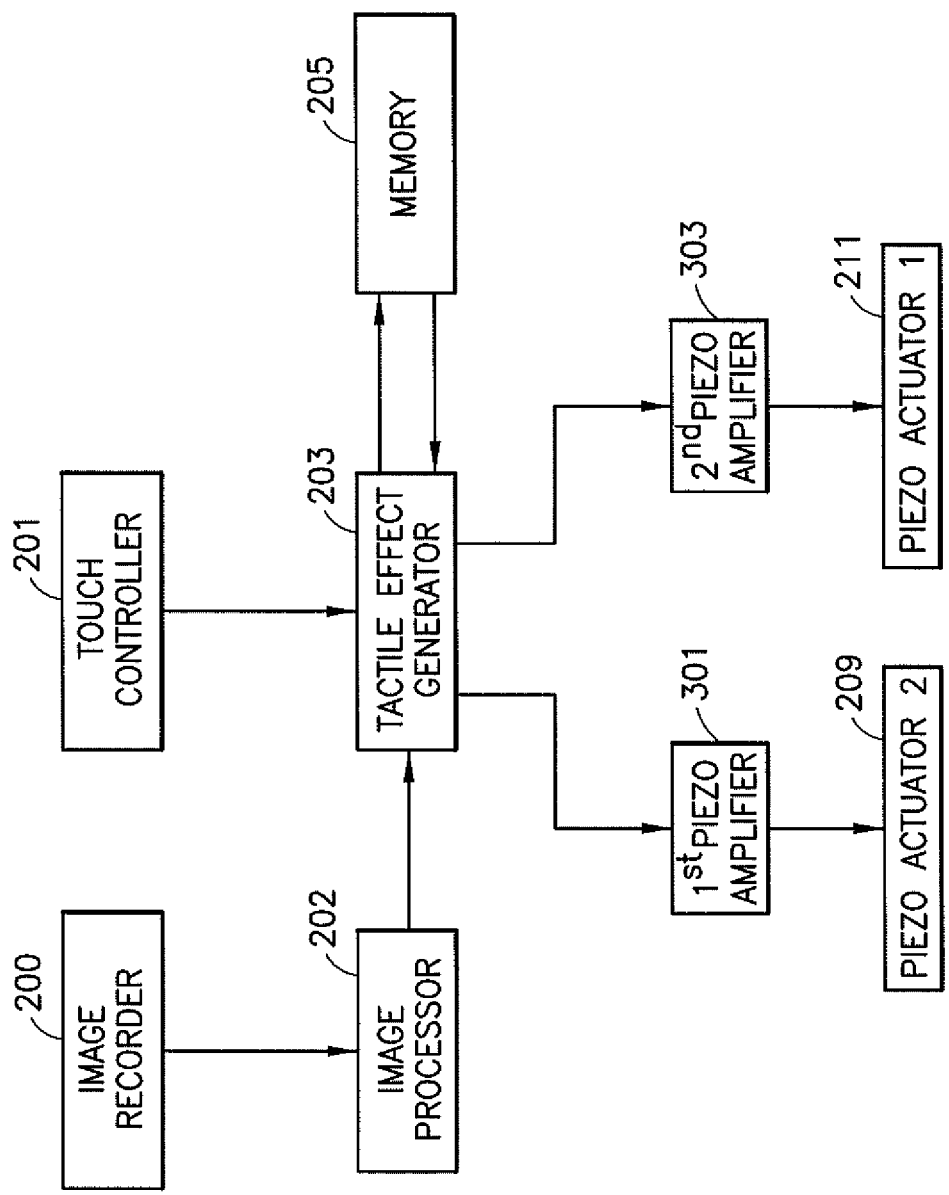

With respect to FIG. 4 the tactile effect generator system apparatus shown differs from the tactile effect generator system apparatus shown in FIG. 3 in that each piezo actuator is configured to be supplied a signal from an associated piezo amplifier. Thus for example as shown in FIG. 4 the first piezo actuator 209, piezo actuator 1 receives an actuation signal from a first piezo amplifier 301 and the second piezo actuator 211, piezo actuator 2 is configured to receive a second actuation signal from a second piezo amplifier 303.

Figure 5:
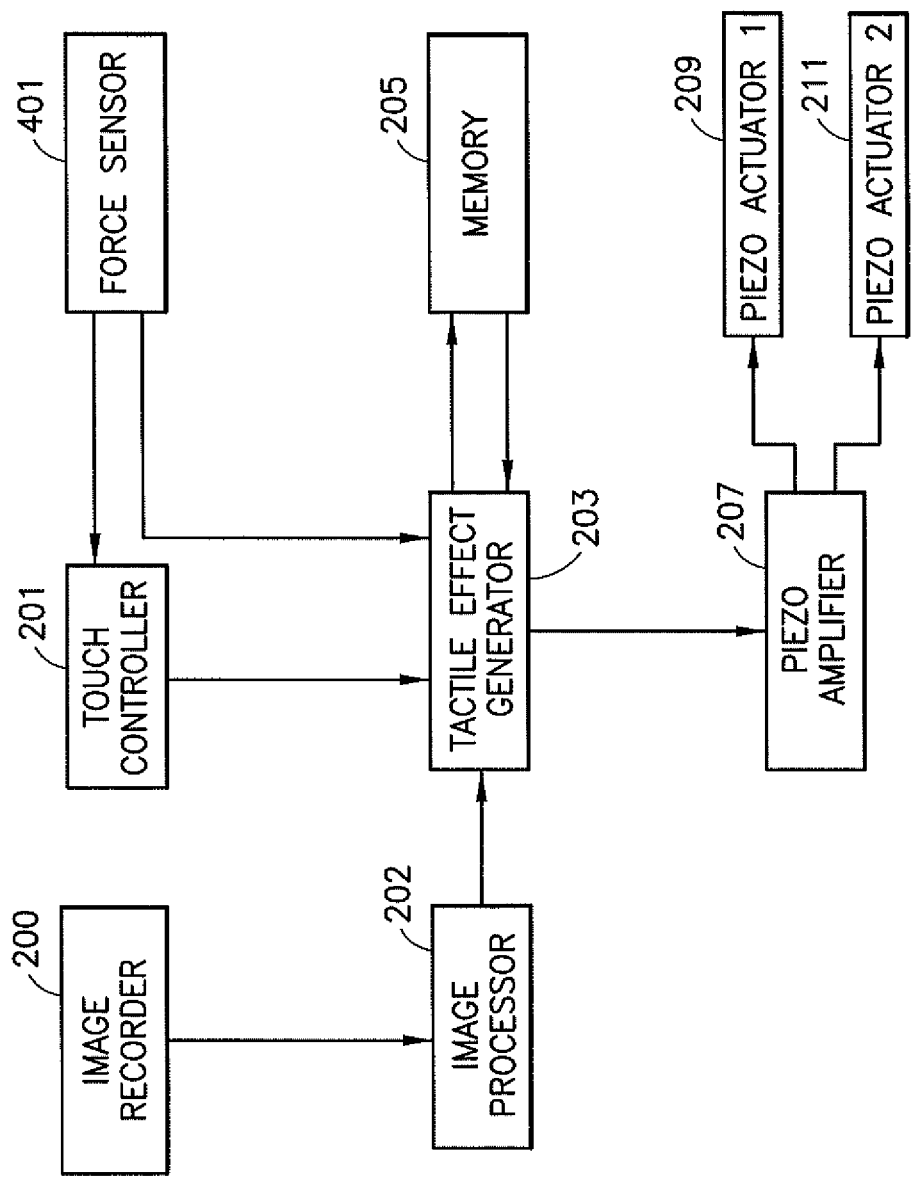

With respect to FIG. 5 the tactile effect generator system apparatus shown differs from the tactile effect generator system apparatus as shown in FIG. 3 in that the tactile effect generator apparatus is configured to receive a further input from a force sensor 401.

In some embodiments therefore the tactile effect generator system apparatus comprises a force sensor 401 configured to determine the force applied to the display. The force sensor 401 can in some embodiments be implemented as a strain gauge or piezo force sensor. In further embodiments the force sensor 401 is implemented as at least one of the piezo actuators operating in reverse wherein a displacement of the display by the force generates an electrical signal within the actuator which can be passed to the touch controller 401. In some other embodiments the actuator output can be passed to the tactile effect generator 203. In some embodiments the force sensor 401 can be implemented as any suitable force sensor or pressure sensor implementation. In some embodiments a force sensor can be implemented by driving the piezo with a driving signal and then measuring the charge or discharge time constant of the piezo. A piezo actuator will behave almost like a capacitor when the actuator is charged with a driving signal. If a force is applied onto the display the actuator will bend and therefore the capacitance value of the actuator will change. The capacitance of the piezo actuator can be measured or monitored for example by a LCR meter and therefore the applied force can be calculated based on the capacitance change of the piezo actuator.

In some embodiments a special controller with functionality to drive and monitor at the same time the charge or discharge constant can be used to interpret the force applied on the display and therefore deliver the force values. This controller can thus in some embodiments be implemented instead of an separate force sensor as the actuator can be used the measure the force as described herein.

Figure 6:
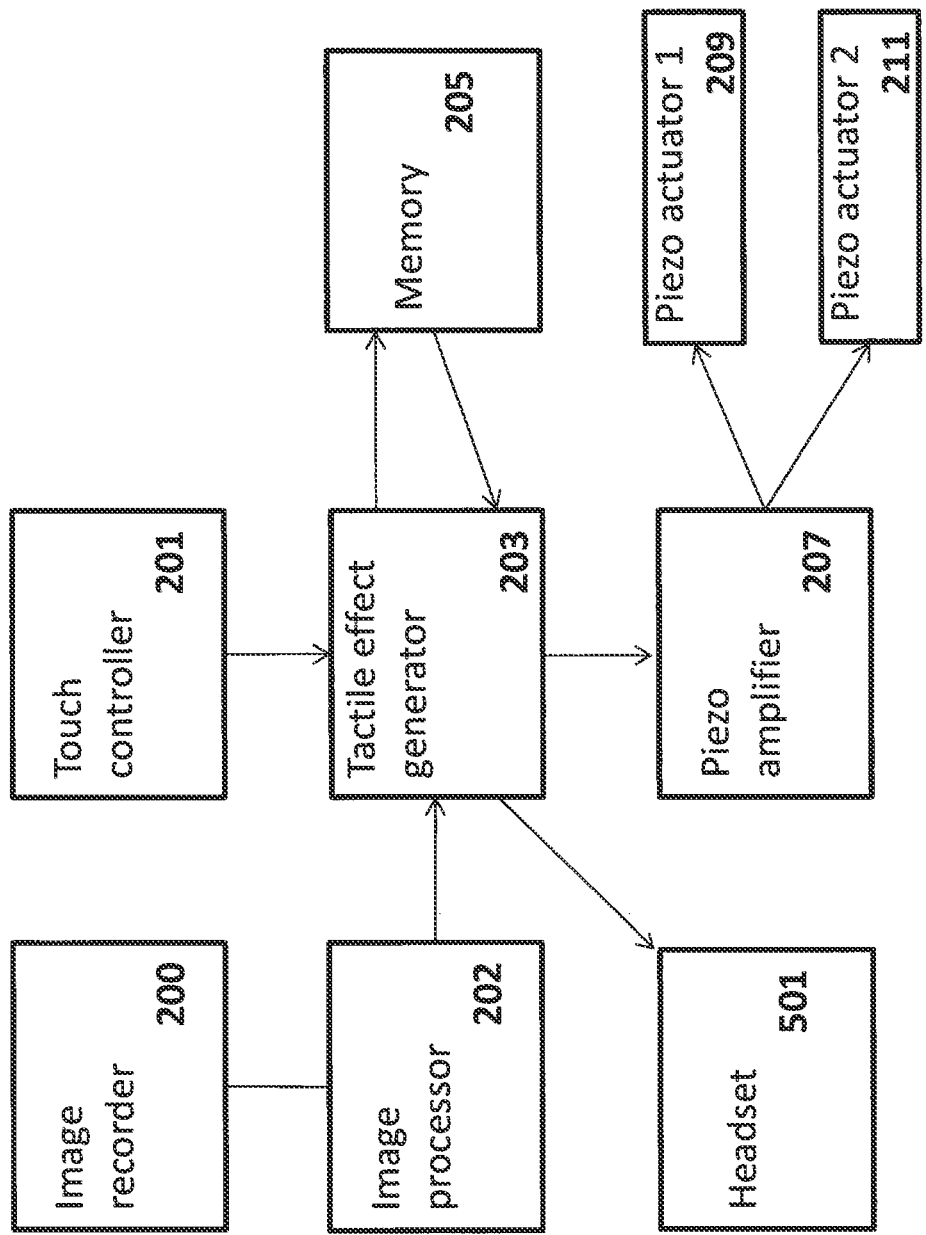

The tactile effect generator system apparatus as shown in FIG. 6 differs from the tactile effect generator system apparatus shown in FIG. 3 in that the tactile effect generator 203 in the example shown in FIG. 6 is further configured to generate not only tactile "audio" signals which are passed to the piezo actuator but configured to generate an audio signal which can be output to an external audio actuator such as the headset 501 shown in FIG. 6. Thus in some embodiments the tactile effect generator 203 can be configured to generate an external audio feedback signal concurrently with the generation of the tactile feedback or separate from the tactile feedback.

Figure 7:
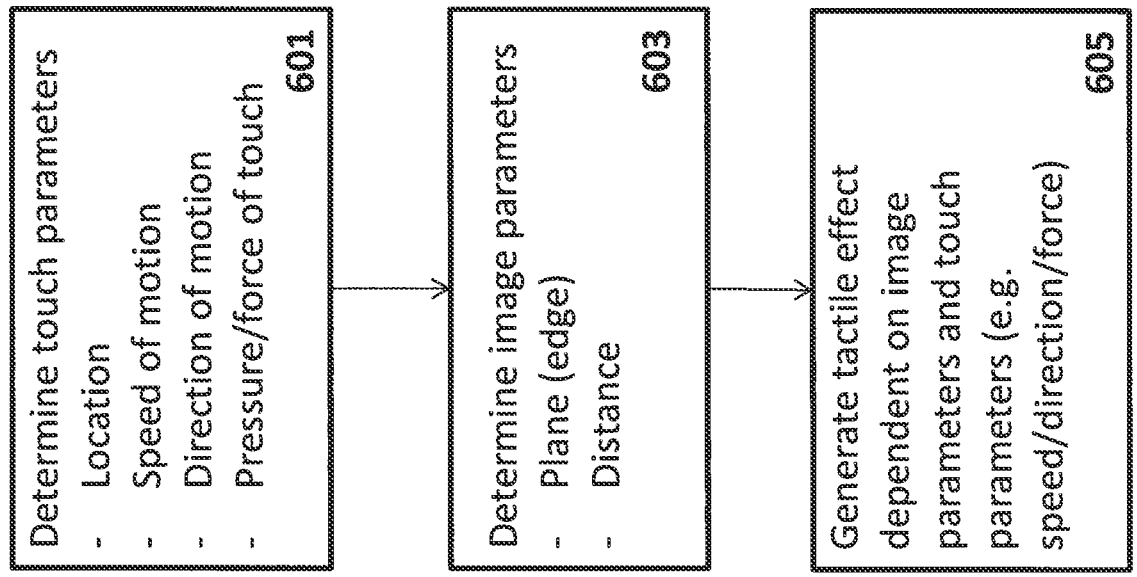
FIG. 7 shows a flow diagram of the overview of the operation of the touch effect generation system apparatus according to some embodiments.

With respect to FIG. 7 an overview of the operation of the tactile effect generator system apparatus as shown in FIGS. 3 to 6 is shown with respect to some embodiments.

As described herein the touch controller 201 can be configured to receive the inputs from the touch screen and be configured to determine touch parameters suitable for determining tactile effect generation.

In some embodiments the touch controller 201 can be configured to generate touch parameters. The touch parameters can in some embodiments comprise a touch location, where the location of a touch is experienced. In some embodiments the touch parameter comprises a touch velocity, in other words the motion of the touch over a series of time instances. The touch velocity parameter can in some embodiments be represented or separated into a speed of motion and a direction of motion. In some embodiments the touch parameters comprise a pressure or force of the touch, in other words the amount of pressure applied by the touching object on the screen.

The touch controller 201 can then output these touch parameters to the tactile effect generator 203.

The operation of determining the touch parameters is shown in FIG. 7 by step 601.

In some embodiments, as described herein, the image processor 202 can be configured to generate image parameters or image model parameters. The image parameters or image model parameters can for example be models of polygons defining planes within the image or polygons defined by vertices indicated by contiguous or partially contiguous edges determined by the image processor. In some embodiments the image parameters or image model parameters can comprise image depth or distances associated with a defined polygon. In some embodiments the image parameter or model parameter can be for example a depth gradient defining a change in the distance or depth across a face of a polygon (this for example can be shown by a structure which recedes into the distance). In some embodiments the polygon can be associated with more than one depth gradient, for example where an image polygon represents a shape which is inclined and also offset (for example a structure which not only recedes into the distance in one direction but also in a further direction, where each direction can have a separate gradient).

The image processor 202 can in some embodiments be configured to output the image parameters or image model parameters to the tactile effect generator 203.

The operation of determining the image parameters or image model parameters is shown in FIG. 7 by step 603.

In some embodiments the tactile effect generator 203 can be configured to receive these touch parameters and the image parameters or image model parameters and from these parameters determine an associated touch context.

Thus in some embodiments the tactile effect generator 203 can receive the 'touch' location from the touch controller and analyse the location value relative to a location within the image parameter or image model parameters to determine whether there is any tactile effect region at this location and which tactile effect is to be generated at the location. For example in some embodiments the touch screen may comprise an area of the screen which shows a first wall directly in front of the user, a corner and a second wall which lines a path or corridor leading away from the user. The tactile effect generator 203 can having received the touch parameter location, determine whether the location is over the first wall, the corner or the second wall and generate a tactile effect or simulated texture to be experienced at the location. In some embodiments this can be carried out by the tactile effect generator 203 looking up the location from the image model parameters which links to or points to a tactile effect map stored in the memory 205.

In some embodiments the image parameters or image model parameters can determine not only the type of texture or effect to be generated but whether the texture or effect has directionality and how this directionality or other touch parameter dependency effects the tactile effect generation. Thus for the texture effect example the tactile effect generator 203 can be configured to determine whether or not the image model defines a polygon with a depth or distance gradient and therefore directionality and retrieve parameters associated with this directionality. Furthermore in some embodiments the image parameter or image model parameter can determine whether the texture or effect has 'force-sensitivity', for example whether the texture or effect changes the 'harder' the touch is. For example where the image processor can determine a characteristic associated with the material defined by the polygon. Thus for example a polygon defining a glass surface may be associated with a different force related effect when compared to a polygon defining a brick surface. In such embodiments the 'force' of the touch can be determined as corresponding to the pressure or force of the touch.

The tactile effect generator 203 therefore in some embodiments can, having determined the image model parameters and touch parameters, generate tactile effects dependent on the context and touch parameters. The generated tactile effect can then be passed to the piezo amplifier 207 as described herein.

The operation of generating the tactile effect depending on the image model and touch parameters is shown in FIG. 7 by step 605.

Figure 8:
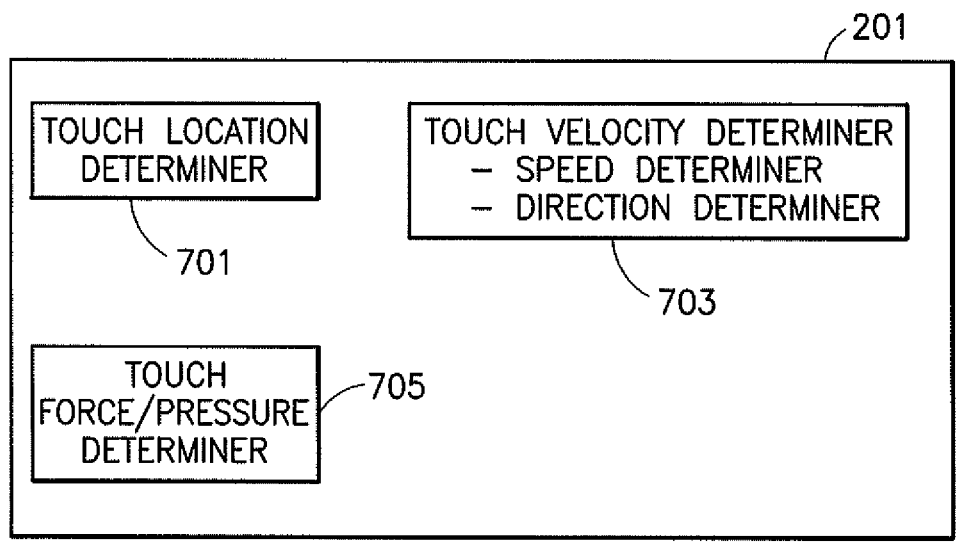
FIG. 8 shows schematically a touch controller as shown in the tactile effect generator system apparatus from FIGS. 3 to 6 according to some embodiments.

With respect to FIG. 8 an example touch controller 201 is shown in further detail. Furthermore with respect to FIG. 11 the operation of the touch controller according to some embodiments as shown in FIG. 8 is shown in further detail.

In some embodiments the touch controller 201 comprises a touch location determiner 701. The touch location determiner 701 can be configured to receive the touch inputs from the display and be configured to determine a touch location or position value. The touch location can in some embodiments be represented as a two (or three dimensional where pressure of force is combined) dimensional value relative to a defined origin point.

Figure 11:
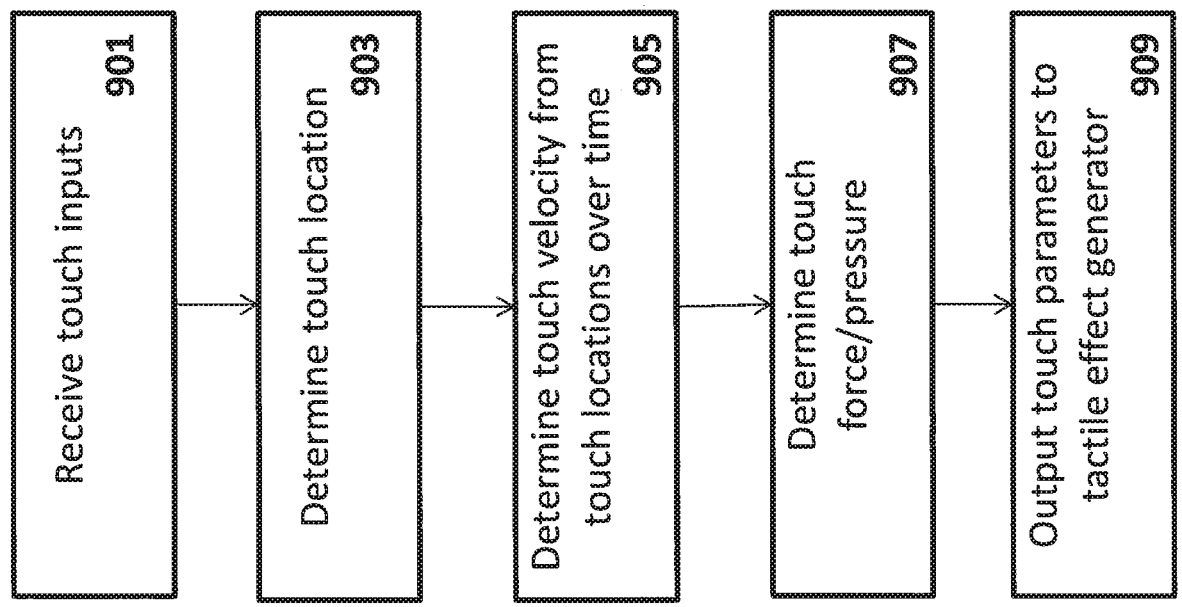
FIG. 11 shows a flow diagram of the operation of the touch controller shown in FIG. 8 according to some embodiments.

The operation of receiving the touch input is shown in FIG. 11 by step 901.

The operation of determining the touch location is shown in FIG. 11 by step 903.

The touch location determiner 701 can in some embodiments be configured to determine location values according to any suitable format. Furthermore the locations can be configured to indicate a single touch, or multi-touch locations relative to the origin or multi-touch locations relative to other touch locations.

In some embodiments the touch controller 201 can comprise a touch velocity determiner 703. The touch velocity determiner can be configured to determine a motion of a touch dependent on a series of touch locations over time. The touch velocity determiner can in some embodiments be configured to determine the touch velocity in terms of a touch speed and a touch direction component.

The operation of determining touch velocity from touch locations over time is shown in FIG. 11 by step 905.

In some embodiments the touch controller 201 comprises a touch force/pressure determiner 705. The touch force/pressure determiner 705 can be configured in some embodiments to determine an approximation of the force or pressure applied to the screen depending on the touch impact area. It would be understood that the greater the pressure the user applies to the screen the greater the touch surface area due to deformation of the fingertip under pressure. Thus in some embodiments the touch controller 201 can be configured to detect a touch surface area as a parameter which can be passed to the touch force/pressure determiner 705.

In some embodiments where the touch controller 201 receives an input from a force or pressure sensor such as shown in FIG. 5 by the force sensor 401, the touch controller 201 can be configured to use the sensor input to determine the contexts for the tactile effect generator 203. The tactile effect generator 203 can then be configured to generate simulated tactile effects dependent on the force/pressure input. For example a different simulated tactile effect can be generated dependent on the pressure being applied, so in some embodiments the more pressure or the greater the surface area of the fingertip sensed on the touch screen the greater the modification from the base signal used to generate the tactile effect.

The determination of the touch force/pressure determiner is shown in FIG. 11 by step 907.

The touch controller in the form of touch location determiner, touch velocity determine, and touch force/pressure determiner can then output these touch parameters to the tactile effective generator.

The operation of outputting the touch parameters to the tactile effect generator is shown in FIG. 11 by step 909.

Figure 9:
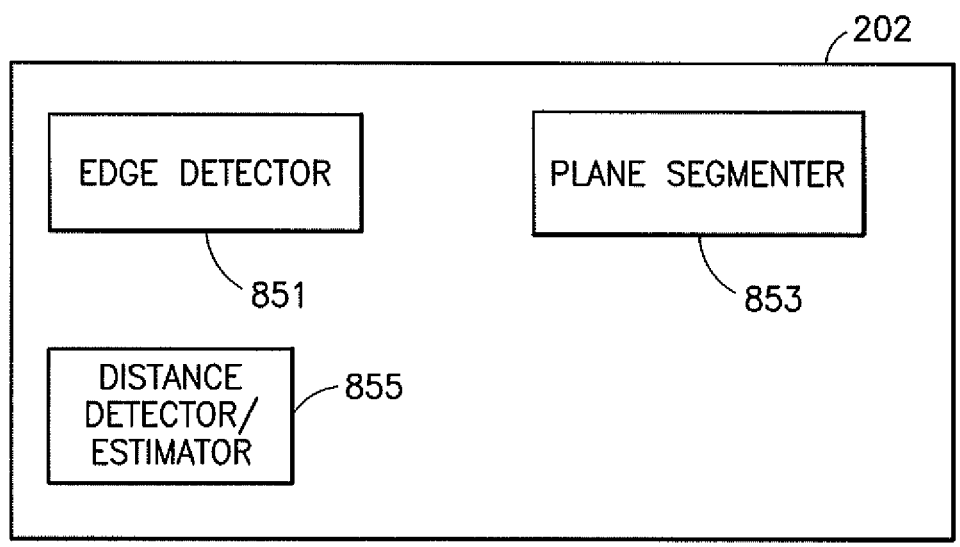
FIG. 9 shows schematically an image processor as shown in the tactile effect generator system apparatus from FIGS. 3 to 6 according to some embodiments.

With respect to FIG. 9 an example image processor 202 is shown in further detail. Furthermore with respect to FIG. 12 the operation of the image processor according to some embodiments as shown in FIG. 9 is shown in further detail.

The image processor in some embodiments can as described herein be configured to receive an image for processing. The image can be any suitable image which is to be displayed on the display. The image can for example be received from a 'live' camera image which is also output to the display. An example camera image which is used herein as an example image is shown with respect to FIG. 15, where the input image 15 shows a recorded video frame 1301 of a typical office structure with a 'main' corridor, offices behind a first wall to the left of the image and cubicles separated by side corridors to the right of the image.

It would be understood that in some embodiments the image can be an 'augmented' image, in other words a camera image with information overlays. In some embodiments the image is 'retrieved', such as an image retrieved from memory or received from a further apparatus. In some embodiments the image can be a 'generated image' or artificial image, such as for example a rendered image for a computer game to be displayed on the display.

Figure 12:
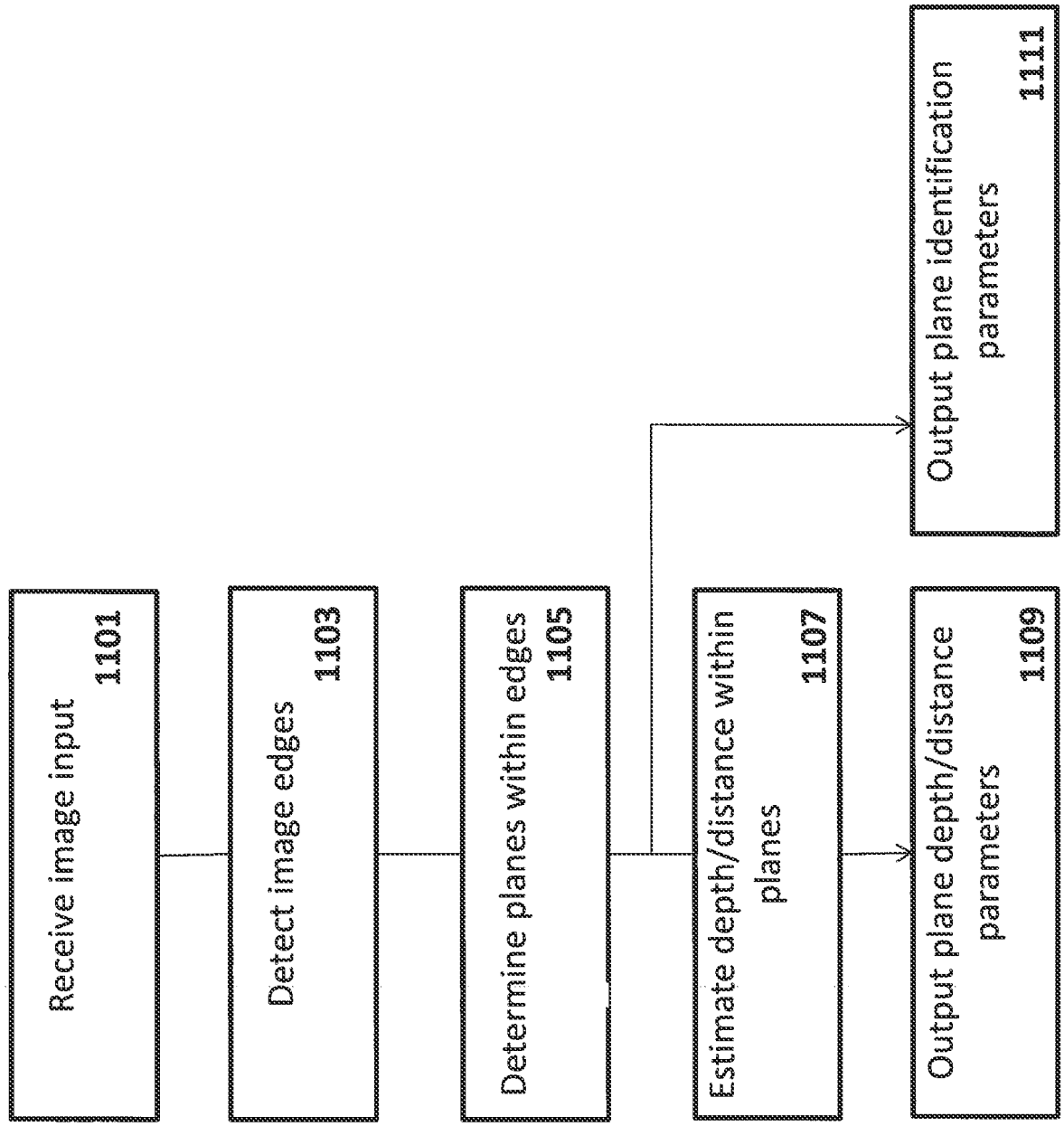
FIG. 12 shows a flow diagram of the operation of the image processor shown in FIG. 9 according to some embodiments.

The operation of receiving the image input is shown in FIG. 12 by step 1101.

In some embodiments the image processor comprises an edge detector 851. The edge detector 851 in some embodiments receives the image and processes the image to determine 'edges' where the image chrome or image luma change significantly causing a discontinuity. The edge detector 851 can be any suitable means for edge detecting within images. It would be understood that the edge detector 851 as described herein is one method for defining or determining polygons within the image, and as such any suitable image processing operation can be used. Therefore in some embodiments any suitable polygon detector or means for determining or defining polygons from the image can be employed.

Figure 16:
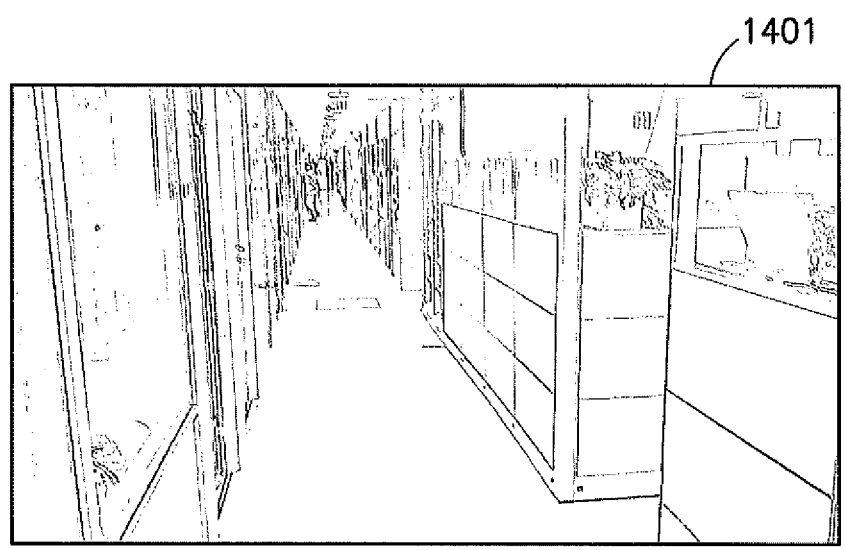
FIG. 16 shows an example output of the image processor edge detector using the example image from the image recorder or camera according to some embodiments.

An example output image from an edge detector 851 with respect to the example image is shown in FIG. 16 where the edge detector 851 'edge' image 1401 shows edges of the example image. In some embodiments the edge values can be output as image parameters or image model parameters defining areas or lines on the display which cause a first type of tactile effect to be generated.

The operation of generating image edges is shown in FIG. 12 by step 1103.

In some embodiments the image processor comprises a plane segmenter 853. The plane segmenter 853 in some embodiments receives the image and processes the image to determine 'planes' or polygons which form the image. In some embodiments it would be understood that some of the vertices of the 'planes' or polygons are at least some of the edges defined by the edge detector 851. Thus in some embodiments the plane segmenter 853 can be configured to receive the output of the edge detector 851 and using the output edge values define suitable planes of polygons within the image. The plane segmenter 853 can be any suitable means for detecting planes or polygons within images. For example in some embodiments the plane segmenter performs plane determination in a manner similar to that described in U.S. Pat. No. 6,775,396.

Figure 17:
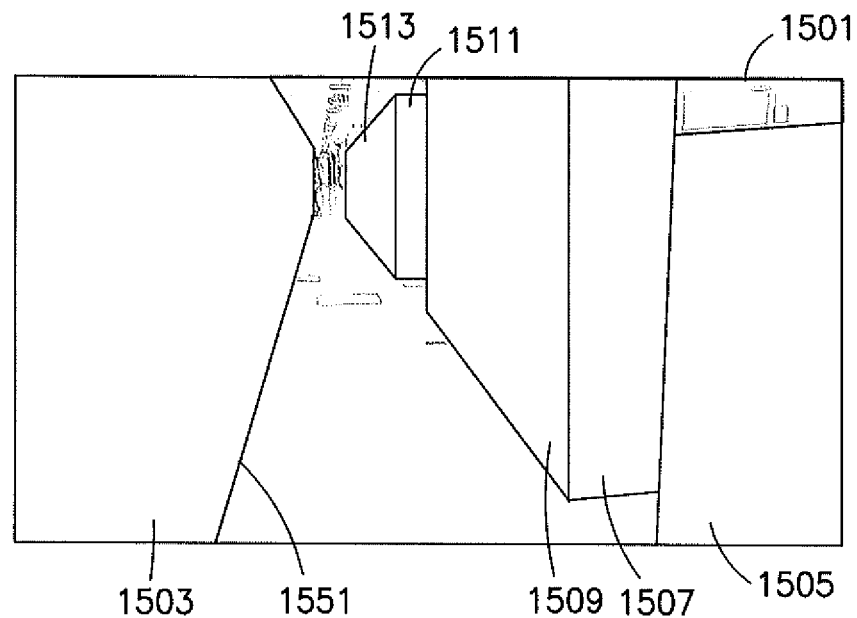
FIG. 17 shows an example output of the image processor plane segmenter using the example image from the image recorder or camera according to some embodiments.

An example output image from a plane segmenter 853 with respect to the example image is shown in FIG. 17 where the plane segmenter 853 'plane' image 1501 shows various determined planes or polygons which occur within the example image. In the example 'plane' image 1501 is shown a first plane or polygon 1503 which is found from the first wall, a second plane or polygon 1505 which is the nearest part of the second wall, a third plane or polygon 1507 which is the visible first side corridor part relative to the second wall, a fourth plane or polygon 1509 which is the mid part of the second wall between the first and second side corridors, a fifth plane or polygon 1511 which is the visible second side corridor part relative to the second wall, and a sixth plane or polygon 1513 which is the far part of the second wall from the second side corridor to the distance or 'infinity'. Furthermore is shown in FIG. 17 an example of the edge 1551 which defines the first plane 1503.

In some embodiments the plane edge values can be output as image parameters or image model parameters defining planes (or polygons) or edges (lines) on the display which cause various type of tactile effect to be generated.

The operation of generating planes or polygons is shown in FIG. 12 by step 1105.

The operation of outputting the planes or polygons is shown in FIG. 12 by step 1111.

In some embodiments the image processor comprises a distance detector/estimator 855. The distance detector/estimator 855 in some embodiments receives the image and detects how far each pixel in the image is from a reference point. In some embodiments the reference point it the viewpoint of the image. In some embodiments the distance detector/estimator 855 can be configured to determine the distance from two images which are recorded at different viewpoints or positions such that the difference in parallax can be used to determine the distance or depth from the image capture point. Thus in such embodiments there can be two cameras or at least one camera moving to enable a main image and a second distance difference image to be captured.

In some embodiments the distance detector/estimator 855 can be configured to receive distance estimation results from a range detector, such as an optical or ultrasonic range detector to be applied to the image.

In some embodiments the distance or depth map can be determined from a single image, for example by using a local depth hypothesis For example generating a depth map from a single image by firstly grouping the image into similar regions to preserve details and segments the image into salient regions and then generating local depth hypothesis using structural information of the input image and salient regions, and finally generating a depth map using local depth hypothesis and grouped regions. In some embodiments the single image can be used to 'guess' the depth orientations processes the image to determine the depth or distance of the 'planes' or polygons from the viewer point of view.

For example it is generally known that objects as they recede from the viewer appear smaller, an effect generally known as receding to the vanishing point. Thus where it is known that the image contains regular polygons any deviation from the regularity can be guessed as being due to object receding or approaching the viewpoint. Similarly it would be seen that as objects recede into the background they appear duller or less bright and so where the image is in uniform lighting the duller an object surface is the further the object surface is from the viewer.

In some embodiments the distance or depth map can be a gradient applicable to the determined planes or polygons. It would be understood that in some embodiments that a polygon or plane can have more than one depth gradient where the object is angled such that the surface recedes from the viewpoint in more than one direction (for example a single gradient can be a fence or vertical wall which appears to recede to the distance and thus has a gradient with a direction as the surface recedes, and two gradients can be a fence or wall which also inclines to the vertical and thus has an additional 'vertical' gradient component).

In some embodiments the distance or depth values can be output as image parameters or image model parameters further defining planes (or polygons) or edges (lines) on the display which cause various type of tactile effect to be generated.

The operation of generating distance or depth values is shown in FIG. 12 by step 1107.

The operation of outputting the distance or depth values is shown in FIG. 12 by step 1109.

Figure 10:
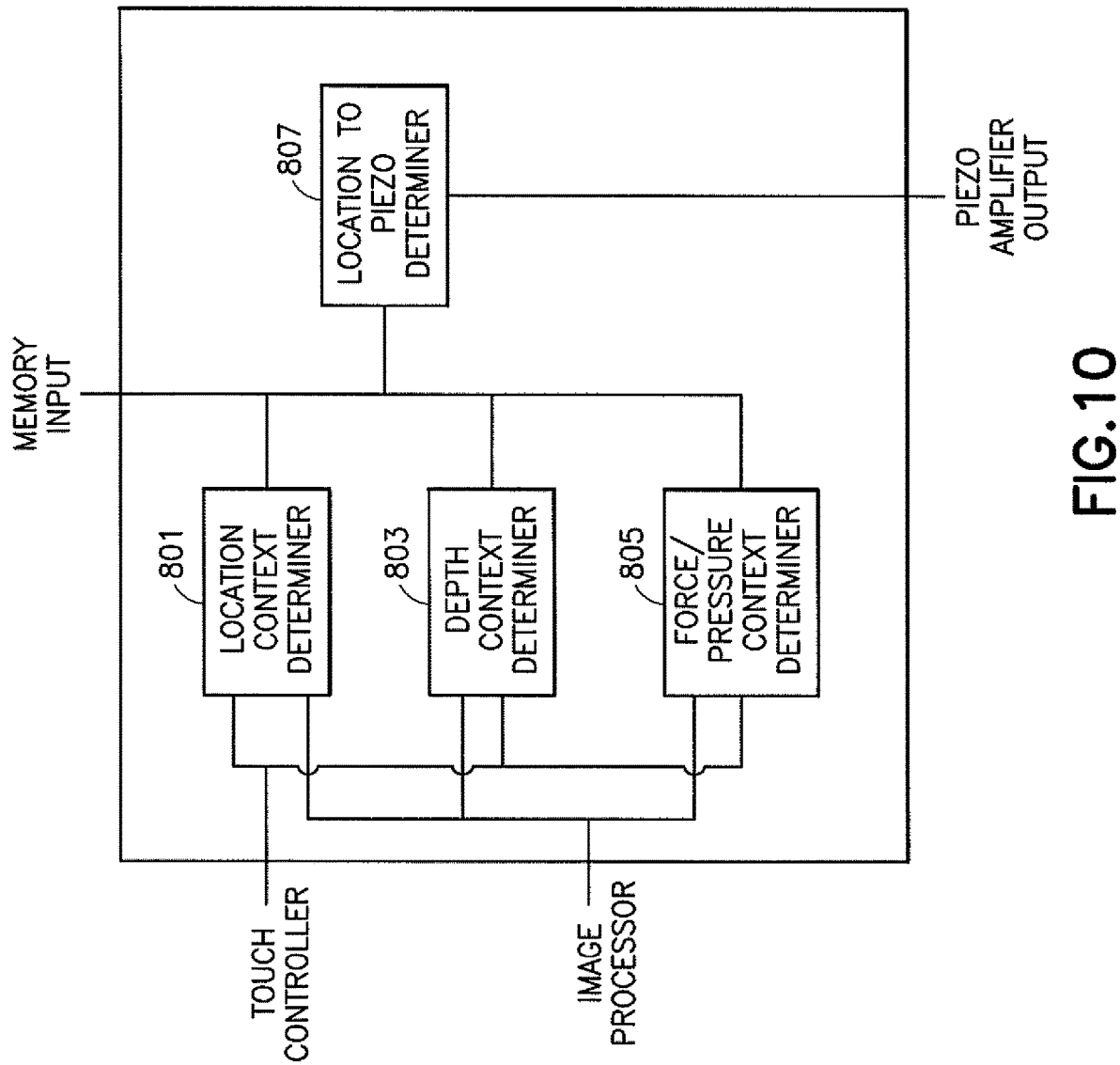
FIG. 10 shows schematically a tactile effect generator as shown in the tactile effect generator system apparatus from FIGS. 3 to 6 according to some embodiments.

With respect to FIG. 10 an example tactile effect generator 203 is shown in further detail. Furthermore with respect to FIGS. 13 and 14 the operation with respect to some embodiments of the tactile effect generator 203 as shown in FIG. 10 is described in further detail.

In some embodiments the tactile effect generator 203 is configured to receive the touch parameters from the touch controller 201. The touch controller 201 as described herein can in some embodiments generate parameters such as location, velocity (speed and direction), period and force/pressure parameter data and pass the parameter data to the tactile effect generator 203.

Figure 13:
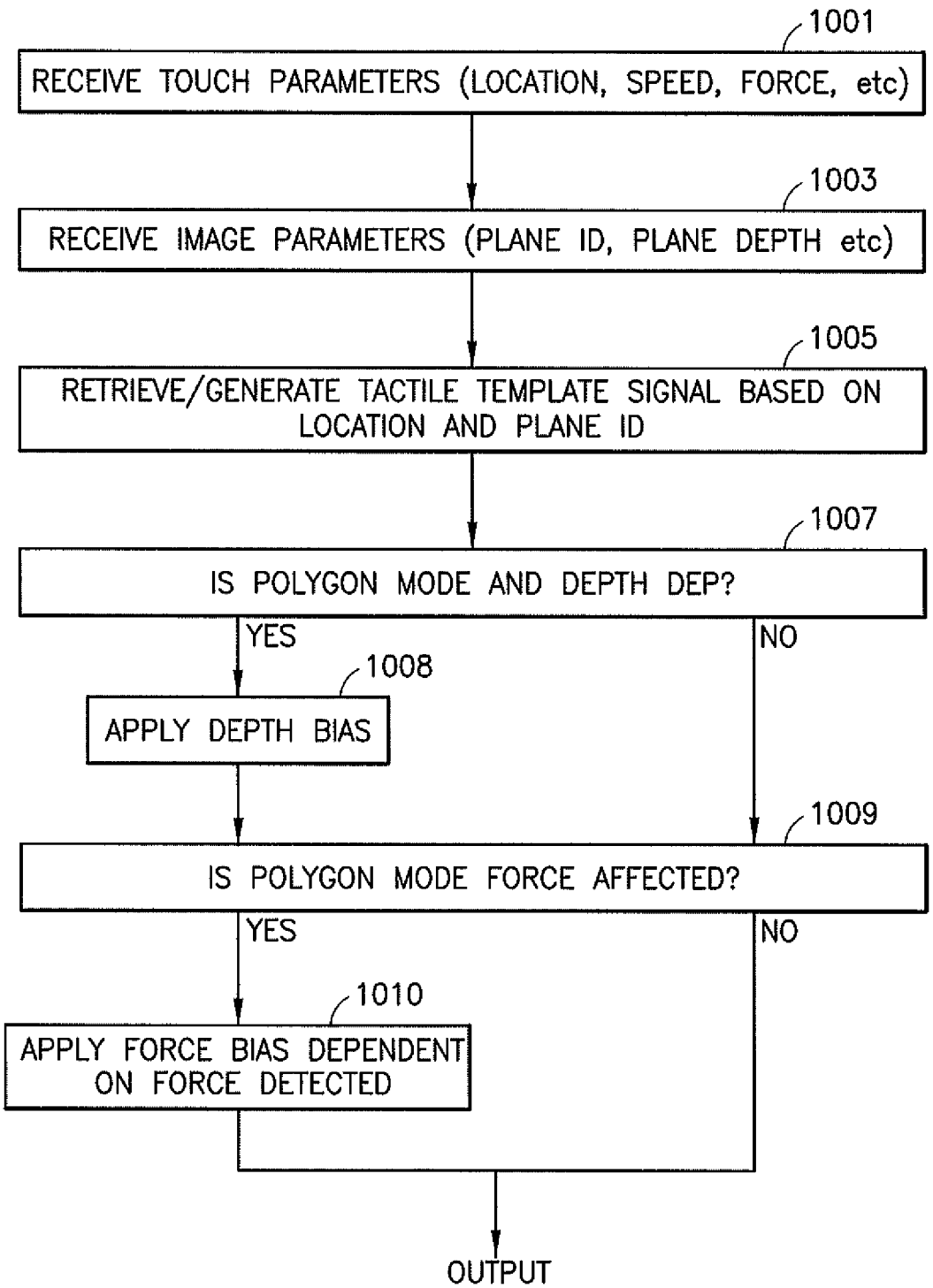
FIG. 13 shows a flow diagram of the operation of the tactile effect generator as shown in FIG. 10 according to some embodiments.

The operation of receiving the touch parameters is shown in FIG. 13 by step 1001.

Similarly the tactile effect generator 203 can in some embodiments be configured to receive from the image processor 202 the image parameters or image model parameters such as edge parameters, polygon (or plane) parameters and depth map or distance parameters.

The operation of receiving the image parameters or image model parameters is shown in FIG. 13 by step 1003.

In some embodiments the tactile effect generator 203 can comprise a location context determiner 801. The location context determiner 801 is configured to receive the touch parameters and image parameters (and in particular the location touch parameter and the polygon parameter) and determine whether the current touch (defined by the location touch parameter) occurs within a tactile effect region or area (defined by the polygon parameter). In some embodiments the tactile effect region can require more than one touch surface before generating a tactile effect, in other words processing a multi touch input.

The location context determiner 801 can thus in some embodiments determine or test whether the touch location or touch locations are within a tactile or context area.

Where the location context determiner 801 determines that the touch location is outside a tactile or context area in other words the touch is not within a defined tactile effect region then the location context determiner can wait for further touch information. In some embodiments where the location context determiner determines that there is a specific context or tactile effect to be generated depending on the touch location and polygon identified as occurring at the touch location then the location context determiner can be configured to retrieve or generate a tactile template or tactile signal depending on the location and/or polygon identification. In some embodiments the location context determiner 801 is configured to retrieve the tactile template or template signal from the memory. In some embodiments the location context determiner 801 can generate the template signal depending on the location and the polygon identification according to a determined algorithm.

In the examples described herein the template or base signal is initialised, in other words generated or recalled or downloaded from memory dependent on the location and the template or base signal furthermore modified dependent on other parameters, however it would be understood that any parameter can initialise the tactile signal in the form of the template or base signal. For example the parameter which can initialise the template or base signal can in some embodiments be a 'touch' with motion greater than a determined speed, or a 'touch' in a certain direction, or any suitable combination or selection of parameters.

In some embodiments the tactile effect generator 203 comprises a depth context determiner 803. The depth context determiner 803 is configured to receive the image model parameters such as the depth map and compare it against the location of the touch to determine an approximate estimated distance or depth from the viewpoint. In some embodiments the depth context determiner 803 can furthermore receive and analyse the depth map concerning the polygon area.

In some embodiments the depth context determiner 803 can be configured to apply a distance bias to the base or template signal dependent on the depth map.

The operation of determining whether the polygon has an associated depth or distance parameter is shown in FIG. 11 by step 1007. Where the polygon is determined to be depth or distance dependent then the depth context determiner 803 can be configured to apply a depth bias dependent on the depth map parameters associated with the polygon.

The application of a depth bias to the tactile template (tactile signal) is shown in FIG. 13 by step 1008.

Where the polygon is not depth dependent then the operation can pass directly to the force determination operation 1009.

In some embodiments the tactile effect generator 203 comprises a force/pressure context determiner 805. The force/pressure context determinator 805 is configured to receive from the touch controller touch parameters such as force or pressure touch parameters and image model parameters such as pressure dependent or pressure bias parameters. For example as described herein each of the polygons determined in the image may be assigned a pressure bias dependent on the material characteristics of the polygon. For example a glass wall can be configured to generate a tactile effect which 'wobbles' under pressure whereas the brick wall remains constant under pressure. Thus in some embodiments the force/pressure context determiner 805 can analyse the polygon model parameter to determine whether the tactile effect being simulated has a force dependent element.

The operation of determining whether the polygon model parameter is force affected is shown in FIG. 13 by step 1009.

Where the force/pressure context determiner 805 determines that the polygon model parameter is force affected then the force/pressure context determiner 805 can be configured to apply a force bias dependent on the force parameter provided by the touch controller. It would be understood that in some embodiments the force parameter can be provided by any other suitable force sensor or module.

The operation of applying the force bias dependent on the force detected is shown in FIG. 13 by step 1010.

In some embodiments the tactile effect generator 203 comprises a location to piezo mapper or determiner 807 configured to receive the tactile effect signal which can in some embodiments be configured as a tactile effect instance and determine separate signals for each of the piezo transducers from the touch determined position, tactile effect signal distribution and the knowledge or information of the distribution of piezo-electric transducers in the display.

In such embodiments the tactile effect template or tactile signal can be a short "preloaded" audio file or audio signal which can be output as a loop as long as the finger (or touch) is detected. Furthermore when the touch or finger is lifted then the tactile effect template audio file playback ends. In some embodiments the touch parameters and image model parameters can modify the audio file playback in other words an arbitrary processing of the audio file to be output as a tactile effect can be applied based on the 'polygon'.

For example the pitch or frequency of the audio file can be adjusted based on the polygon identification at the location or the estimated depth of the polygon at the location of the touch. For example in such embodiments the nearer the polygon at the touch location then the tactile effect generator is configured to produce a higher pitch audio file and similarly a further away polygon produces a lower pitch audio.

In some embodiments the volume or amplitude of the audio signal or tactile signal can be adjusted based on the polygon identification or polygon depth parameters at the touch location. Thus the nearer the polygon at the touch location, the louder the volume and the further the polygon at the touch location, the lower the volume (with infinity or far distance producing zero volume).

In some embodiments difference audio files or audio signals are output dependent on the polygon identification parameter at the touch. For example a receding wall polygon can in some embodiments have associated with it a first audio signal and a blocking wall polygon may have associated with it a second audio signal.

Figure 14:
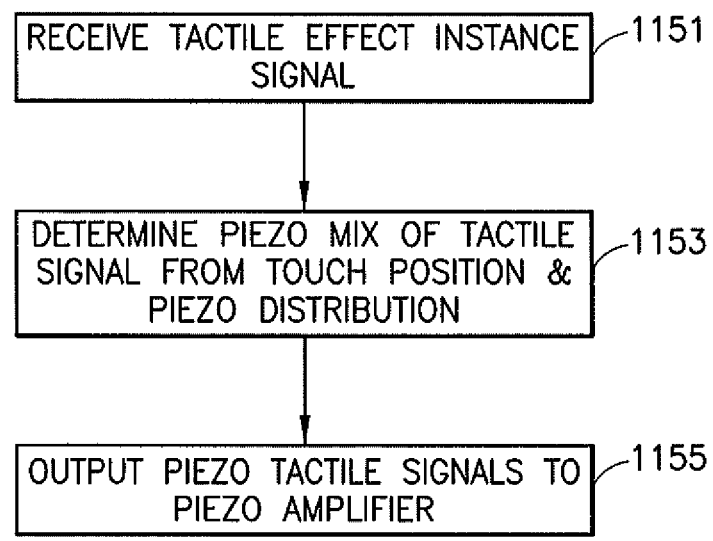
FIG. 14 shows a further flow diagram of the operation of the tactile effect generator as shown in FIG. 10 according to some embodiments.

The operation of receiving the tactile effect signal is shown in FIG. 14 by step 1151.

The determination of the individual piezo electric transducer versions of the tactile effect signal (in other words determining a piezo mix for tacticle signals from touch positions and piezo-electric transducer distributions) is shown in FIG. 14 by step 1153.

Furthermore the location to piezo determiner 807 can then output the piezo-electric transducer signals to the piezo amplifier.

The output of the piezo-electric transducer tactile signals to the piezo amplifier is shown in FIG. 14 by step 1155.

With respect to FIGS. 18 to 22 a series of example use implementations are shown.

In the embodiments described herein the output of tactile effects on the display have been described. It would be understood that in some embodiments the image from the image recorder can in some embodiments be passed to the display and displayed at the same time as a visual representation substantially at the same time as the tactile effects are also displayed as a tactile or audio representation. In some embodiments the image from the image recorder can be overlaid as described herein with layers containing other information.

Figure 15:
FIG. 15 shows an example image from the image recorder or camera according to some embodiments.
Figure 18:
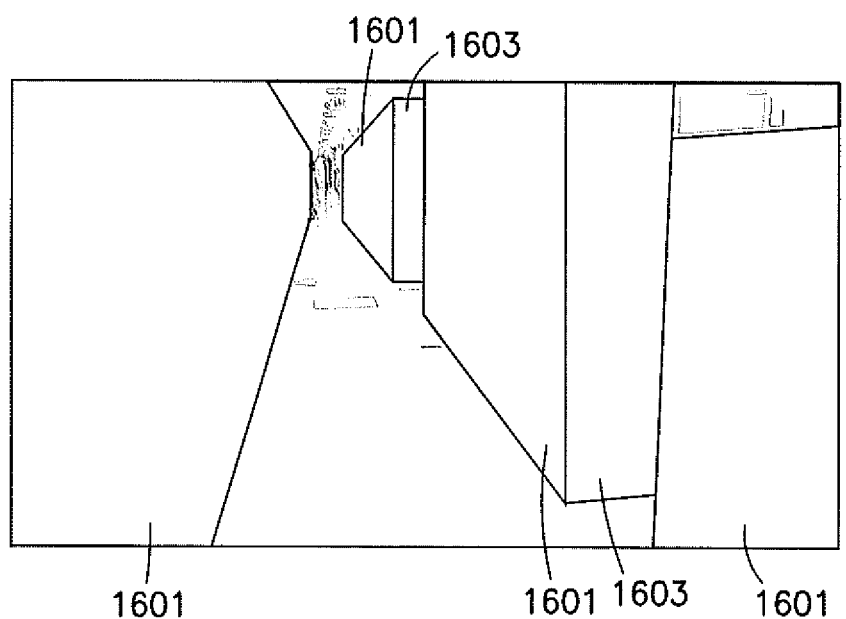
FIG. 18 shows an example of image output planes and identification parameters from the image processor using the example image from the image recorder or camera according to some embodiments.

For example with respect to FIG. 18 an example display is shown displaying an image of the office example recorded image shown in FIG. 15 with an overlay showing the determined polygons or planes as determined by the plane segmenter 853.

Thus in this example the image shows the left wall represented by a first plane or polygon which is associated with a first identifier 1601 as the wall is one which recedes from the viewpoint towards a first vanishing point and thus when the user touches a location within the first polygon a first tactile effect is generated at the location of the touch. Furthermore the image shows the second plane or polygon which is the nearest part of the second wall, the fourth plane or polygon which is the mid part of the second wall between the first and second side corridors, and the sixth plane or polygon which is the far part of the second wall from the second side corridor to the distance or 'infinity'. These three polygons are also associated with the first identifier 1601 as the walls also recede from the viewpoint towards the first vanishing point and thus when the user touches a location within the polygon the first tactile effect is generated at the location of the touch.

The image also shows a third plane or polygon which is the visible first side corridor part relative to the second wall which is associated with a second identifier 1603 as the wall is one which recedes from the viewpoint towards a second vanishing point and thus when the user touches a location within the third polygon a second tactile effect is generated at the location of the touch. The image also shows the fifth plane or polygon 1511 which is the visible second side corridor part relative to the second wall which is associated with the second identifier 1603 as the wall is one which recedes from the viewpoint towards a second vanishing point and thus when the user touches a location within the polygon the second tactile effect is generated at the location of the touch.

It would be understood that in some embodiments that the boundary between polygons may further have a third identifier value (an edge value) such that the user when moving over the boundaries can identify a 'corner' feature.

Figure 19:
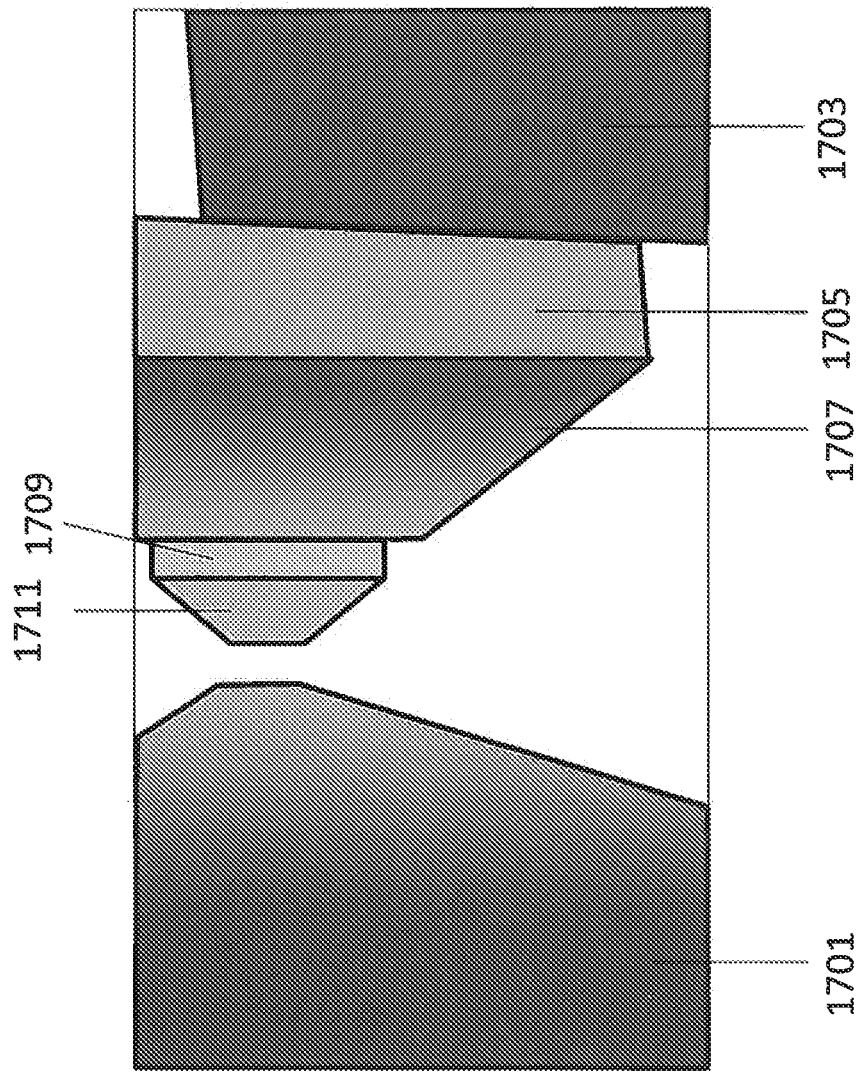
FIG. 19 shows an example of image output planes and depth/distance gradient parameters from the image processor using the example image from the image recorder or camera according to some embodiments.

FIG. 19 shows a further example display displaying a further image of the office example recorded image shown in FIG. 15 with an overlay showing the determined polygons or planes as determined by the plane segmenter 853 and incorporating a depth map model parameter.

Thus in this example the image shows the left wall represented by a first plane or polygon which is associated with a first depth map 1701 which recedes from the viewpoint towards a first vanishing point and thus as the user moves their touch across the first polygon from the near point to a far point the tactile effect is modified based on the estimated depth at the location of the touch. Furthermore the image shows the second plane or polygon depth map 1703 which is the nearest part of the second wall, the fourth plane or polygon depth map 1707 which is the mid part of the second wall between the first and second side corridors, and the sixth plane or polygon depth map 1711 which is the far part of the second wall from the second side corridor to the distance or 'infinity'. These three polygons have thus depth map parameters which have a depth gradient representing the walls receding from the viewpoint towards the first vanishing point and thus when the user touches a location within the polygon the tactile effect is generated at the location of the touch based on the estimated distance.

The image also shows a third plane or polygon depth map 1705 which is the visible first side corridor part relative to the second wall which is associated with a second depth map parameter as the wall is one which recedes from the viewpoint towards a second vanishing point but where the receding gradient is small and thus when the user touches a location within the third polygon a fairly constant tactile effect is generated as the location of the touch moves across the polygon. The image also shows the fifth plane or polygon 1709 which is the visible second side corridor part relative to the second wall which is associated with a second depth map parameter as the wall is one which also recedes from the viewpoint towards the second vanishing point and thus when the user touches a location within the third polygon a fairly constant tactile effect is generated as the location of the touch moves across the polygon.

In some embodiments the depth map parameters affect the localized haptic feedback based on the estimated distance such that for example the further a plane is from the viewpoint of the user, the weaker the feedback. Or the further a part of the plane is from the viewpoint of the user, the weaker the feedback. Thus in the example shown in FIG. 19 there is stronger feedback from the darker areas and weaker from the lighter areas.

Figure 20:
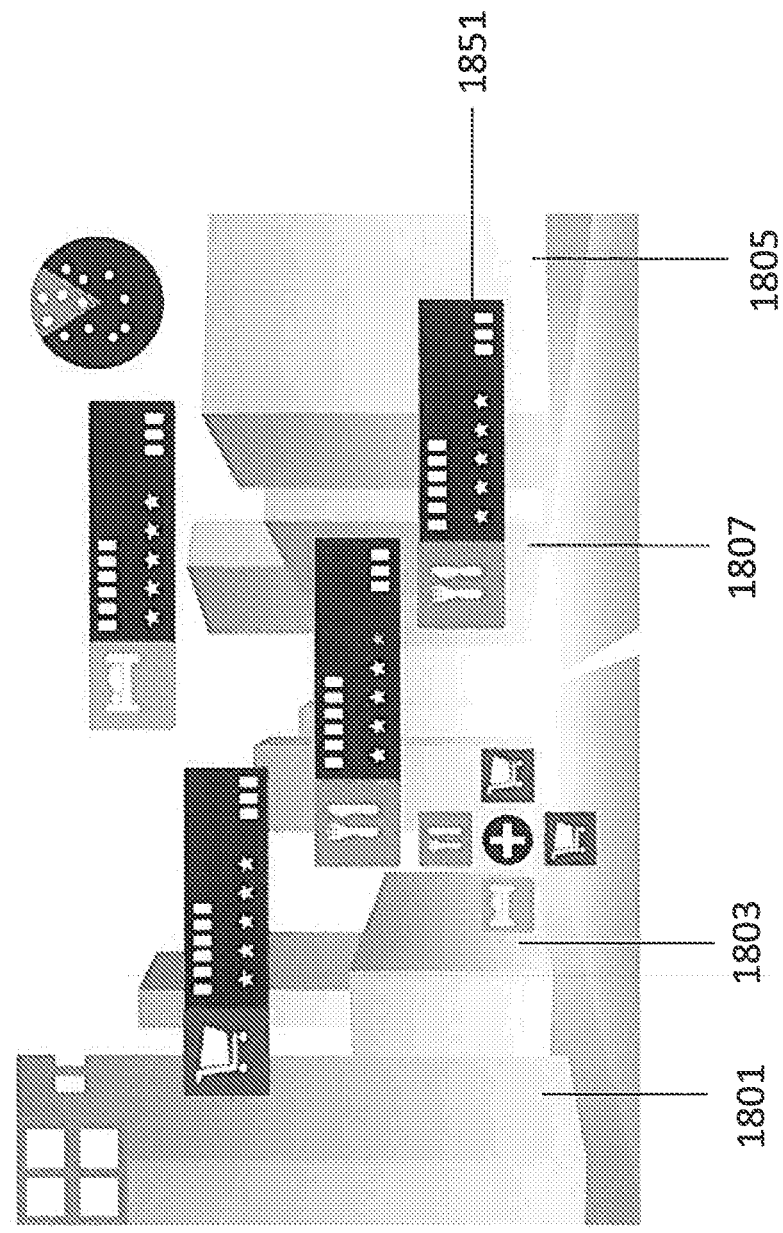
FIG. 20 shows an example augmented reality overlay implementation of image output planes and depth/distance gradient parameters according to some embodiments.

A further example use case is as shown in FIG. 20 with respect to augmented reality applications such as Nokia City Lens. FIG. 20 shows a view of the output of the example application which provides localised haptic feedback about the buildings. This would enable the user not only see the augmented city view, but also feel it. Thus for example the buildings 1801, 1803, 1805, and 1807 can be represented by polygons which have associated identifiers which when the user touches the display at the location of the polygon causes the apparatus to generate a localised tactile effect based on the identifier. This localised tactile effect in some embodiments can further be biased by a depth map parameter.

Another example use case is as a guide for visually handicapped people. Using the camera application (possibly in some special mode) and by touching the viewfinder on the display the user could 'feel' what is in front of the device and therefore where the main camera is pointing. This would be practical both indoors and also in a city where walls of buildings and also streets would give localized haptic feedback. It would be further be understood that in some embodiments haptic feedback could indicate a street name or other identifier to guide the visually handicapped person, for example to indicate where a turn is to be made or whether to continue straight on.

Figure 21:
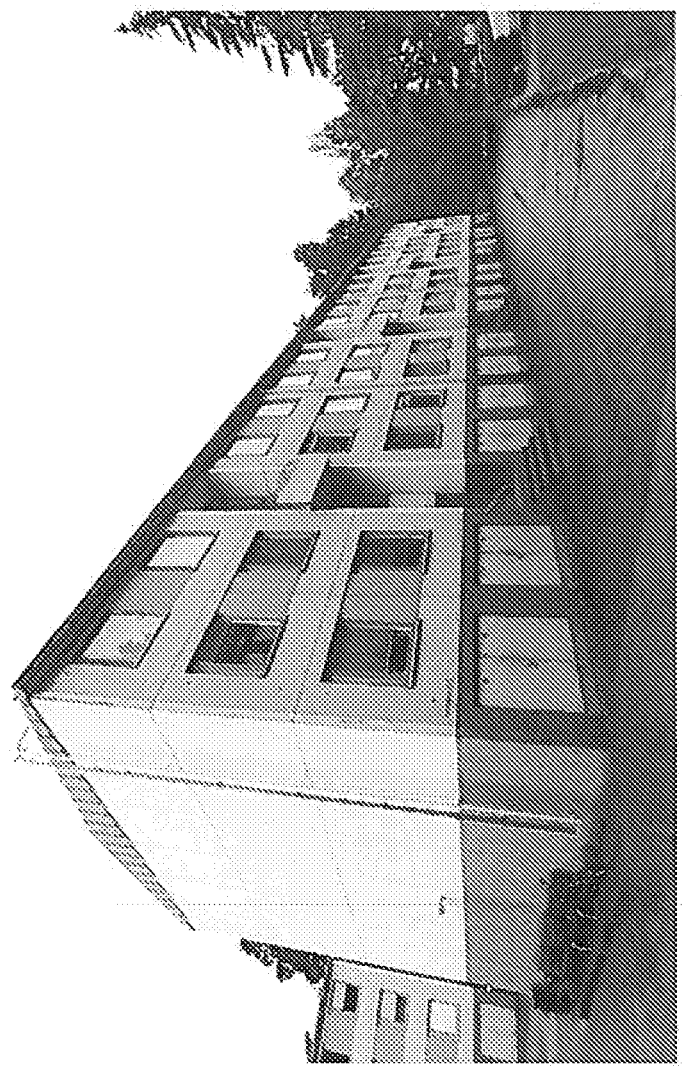
FIGS. 21 and 22 show an example street view and street view overlay implementation of image output plane identification parameters according to some embodiments.
Figure 22:
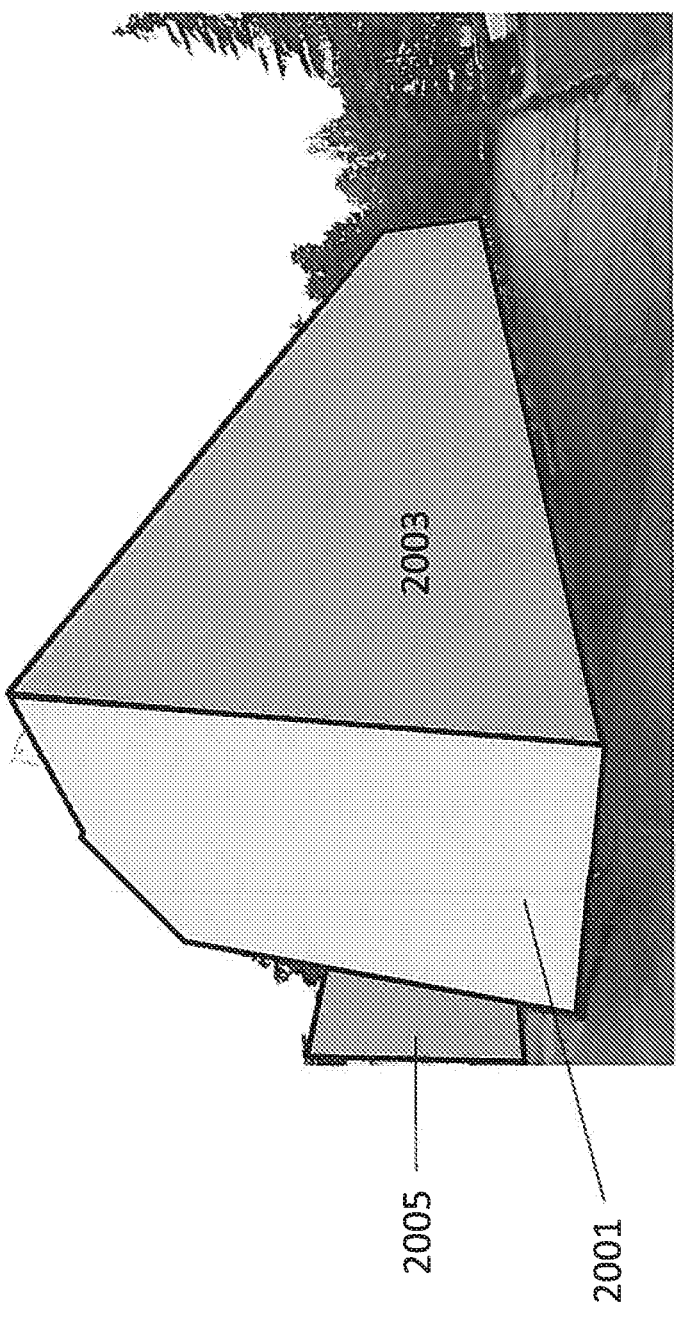

With respect to FIGS. 21 and 22 and example external image is processed according to some embodiments. For example FIG. 21 shows a street view of a building. FIG. 22 shows the processed street view showning the determined planes or polygons and edges. In some embodiments the vertical planes of different directions could generate different tactile feedback but the horizontal plane in other words the ground would not generate feedback. In some embodiments it would be understood that a depth map parameter tactile effect modification of bias can be applied to such an implementation example. Furthermore in some embodiments the horizontal plane could provide the tactile effect, for example to show a pathway across which the user can walk.

Although in the embodiment shown and described herein are single touch operations, it would be understood that the tactile effect generator 203 can be configured to generate tactile effects based on multi-touch inputs.

Furthermore in some embodiments the image may not be displayed or the image parameter may not be required. For example in some embodiments the tactile effect is generated purely on the touch parameter. These embodiments may for example be where the image or 'pseudo image' is static and therefore there is no image parameter required.

It shall be appreciated that the term user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the design of various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory used in the design of embodiments of the application may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be designed by various components such as integrated circuit modules.

As used in this application, the term 'circuitry' refers to all of the following:

(a) hardware-only circuit implementations (such as implementations in only analogy and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and nonlimiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising
   determining at least one image parameter with respect to at least one image displayed on at least one display;
   determining at least one image edge based on the at least one image parameter based, at least partially, on determining at least one discontinuity in the at least one image;
   determining:
      at least one plane within the at least one image edge, and
      at least one polygon within the at least one image edge based, at least partially, on the at least one image edge comprising at least one of:
         a plurality of contiguous or partially contiguous edges, or
         a continuous or partially continuous edge;

generating at least one edge parameter value associated with the at least one image edge, wherein a tactile effect is associated with the at least one edge parameter value;
generating at least one plane parameter value associated with the at least one plane;
generating at least one polygon parameter value associated with the at least one polygon;
determining at least one touch parameter when at least one touch input is detected with respect to the at least one display configured to display the at least one image; and
generating at least one tactile signal at a location of the at least one detected touch input, when the at least one detected touch input at least partially interferes with the at least one image, wherein the at least one tactile signal comprises a predetermined signal selected based on:
the location of the at least one detected touch input, and
the at least one determined polygon,
wherein the selected predetermined signal is modified for generation at the location based on the at least one touch parameter and at least one of:
the at least one edge parameter value,
the at least one plane parameter value, or
the at least one polygon parameter value, and
where the at least one tactile signal is configured to generate the tactile effect, comprising both haptic feedback from the at least one display and audio from the at least one display, wherein the at least one display comprises a tactile audio display component actuated with at least one actuator, wherein the tactile effect is localized at a sub-region of the at least one display proximate the location where the at least one detected touch input at least partially interferes with the at least one image.

2. The method as claimed in claim 1, wherein generating the at least one tactile signal comprises using the at least one display.

3. The method as claimed in claim 1, wherein the audio further comprises at least one audio signal that is configured to be audibly output as a loop for a duration of detection of the at least one touch parameter.

4. The method as claimed in claim 3, wherein at least one of a volume or an amplitude associated with the at least one audio signal is adjustable based on at least one of a polygon identification or a polygon depth parameter at an area of touch.

5. The method as claimed in claim 1, wherein determining the at least one touch parameter further comprises determining at least one of:
at least one touch speed;
at least one touch direction;
at least one touch velocity;
at least one touch acceleration;
at least one touch force; or
at least one touch pressure.

6. The method as claimed in claim 1, wherein determining the at least one image parameter comprises determining at least one of:
an image luma value;
an image chroma value;
an image depth;
an image plane;
an image polygon;
an image line; or
an image edge.

7. The method as claimed in claim 1, wherein modification of the selected predetermined signal comprises at least one of:
modifying an amplitude of the selected predetermined signal;
modifying a frequency of the selected predetermined signal; or
modifying a pitch of the selected predetermined signal.

8. The method as claimed in claim 1, wherein determining the at least one image parameter comprises determining at least one region within the at least one image and associating a region value with the at least one region.

9. The method as claimed in claim 8, wherein determining the at least one touch parameter with respect to the at least one display comprises:
determining a touch location within the at least one region; and wherein the at least one tactile signal is configured based on the region value.

10. The method as claimed in claim 1, wherein determining the at least one image parameter further comprises:
segmenting the at least one image into a plurality of regions;
grouping each of the plurality of regions into groups of similar regions; and
generating a depth map based on the groups of similar regions, wherein the at least one tactile signal is modified based on a distance from a user viewpoint.

11. The method as claimed in claim 1, wherein determining the at least one image parameter further comprises:
determining the at least one image parameter based on at least one polygon identification parameter that identifies a particular polygon in the at least one image.

12. The method as claimed in claim 1, wherein generating the at least one tactile signal further comprises:
determining whether the at least one plane is a horizontal plane; and
generating tactile feedback in response to determining that the at least one plane is not a horizontal plane.

13. The method as claimed in claim 1, further comprising determining the at least one touch parameter based on at least one bias associated with the at least one image, wherein the at least one bias comprises at least one of:
a pressure bias dependent on at least one material characteristic of the at least one polygon in the at least one image;
a depth bias dependent on at least one depth map associated with the at least one image;
a force bias dependent on a force parameter provided with a touch controller; or
a distance bias dependent on the at least one depth map associated with the at least one image.

14. The method as claimed in claim 1, wherein the at least one image comprises an augmented image.

15. An apparatus comprising at least one processor and at least one non-transitory memory including computer program code for one or more programs, the at least one non-transitory memory and the computer program code configured to, with the at least one processor, cause the apparatus at least to:
determine at least one image parameter with respect to at least one image displayed on at least one display;
determine at least one image edge based on the at least one image parameter based, at least partially, on determining at least one discontinuity in the at least one image;
determine:

at least one plane within the at least one image edge, and
at least one polygon within the at least one image edge based, at least partially, on the at least one image edge comprising at least one of:
  a plurality of contiguous or partially contiguous edges, or
  a continuous or partially continuous edge;
generate at least one edge parameter value associated with the at least one image edge, wherein a tactile effect is associated with the at least one edge parameter value;
generate at least one plane parameter value associated with the at least one plane;
generate at least one polygon parameter value associated with the at least one polygon;
determine at least one touch parameter when at least one touch input is detected with respect to the at least one display configured to display the at least one image; and
generate at least one tactile signal at a location of the at least one detected touch input, when the at least one detected touch input at least partially interferes with the at least one image, wherein the at least one tactile signal comprises a predetermined signal selected based on:
  the location of the at least one detected touch input, and
  the at least one determined polygon,
wherein the selected predetermined signal is modified for generation at the location based on the at least one touch parameter and at least one of:
  the at least one edge parameter value,
  the at least one plane parameter value, or
  the at least one polygon parameter value, and
where the at least one tactile signal is configured to generate the tactile effect, comprising both haptic feedback from the at least one display and audio from the at least one display, wherein the at least one display comprises a tactile audio display component actuated with at least one actuator, wherein the tactile effect is localized at a sub-region of the at least one display proximate the location where the at least one detected touch input at least partially interferes with the at least one image.

16. The apparatus as claimed in claim 15, wherein the determined at least one image parameter causes the apparatus to determine at least one of:
  the at least one image edge;
  the at least one plane within the at least one image edge;
  the at least one polygon within the at least one image edge;
  the at least one plane parameter value associated with the at least one plane;
  the at least one polygon parameter value associated with the at least one polygon;
  at least one depth parameter value within the at least one plane; or
  at least one depth parameter value within the at least one polygon.

17. The apparatus as claimed in claim 15, wherein the at least one detected touch input further causes the apparatus to determine at least one of:
  number of touch inputs;
  location of touch inputs;
  size of touch inputs;
  shape of touch inputs; or
  a position of the at least one detected touch input relative to other touch inputs.

18. The apparatus as claimed in claim 15, wherein the location of the at least one detected touch input further causes the apparatus to determine a context information of the location of the at least one detected touch input so as to generate the at least one tactile signal depending on the context information.

19. An apparatus comprising:
  an image processor configured to determine at least one image parameter with respect to at least one image displayed on at least one display, determine at least one image edge based on the at least one image parameter based, at least partially, on determining at least one discontinuity in the at least one image, determine:
    at least one plane within the at least one image edge, and
    at least one polygon within the at least one image edge
  based, at least partially, on the at least one image edge comprising at least one of:
    a plurality of contiguous or partially contiguous edges, or
    a continuous or partially continuous edge,
  generate at least one edge parameter value associated with the at least one image edge, wherein a tactile effect is associated with the at least one edge parameter value, generate at least one plane parameter value associated with the at least one plane, and generate at least one polygon parameter value associated with the at least one polygon;
  a touch controller configured to determine at least one touch parameter when at least one touch input is detected with respect to the at least one display configured to display the at least one image; and
  a tactile effect generator configured to generate at least one tactile signal at a location of the at least one detected touch input, when the at least one detected touch input at least partially interferes with the at least one image, wherein the at least one tactile signal comprises a predetermined signal selected based on:
    the location of the at least one detected touch input, and
    the at least one determined polygon,
  wherein the selected predetermined signal is modified for generation at the location based on the at least one touch parameter and at least one of:
    the at least one edge parameter value,
    the at least one plane parameter value, or
    the at least one polygon parameter value, and
  where the at least one tactile signal is configured to generate the tactile effect, comprising both haptic feedback from the at least one display and audio from the at least one display, wherein the at least one display comprises a tactile audio display component actuated with at least one actuator, wherein the tactile effect is localized at a sub-region of the at least one display proximate the location where the at least one detected touch input at least partially interferes with the at least one image.

* * * * *